US010313114B2

(12) United States Patent
Fu

(10) Patent No.: US 10,313,114 B2
(45) Date of Patent: Jun. 4, 2019

(54) AUTHENTICATION METHOD, DEVICE AND SYSTEM FOR QUANTUM KEY DISTRIBUTION PROCESS

(71) Applicant: Alibaba Group Holding Limited, George Town, Grand Cayman (KY)

(72) Inventor: Yingfang Fu, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 343 days.

(21) Appl. No.: 15/223,477

(22) Filed: Jul. 29, 2016

(65) Prior Publication Data
US 2017/0033926 A1   Feb. 2, 2017

(30) Foreign Application Priority Data

Jul. 31, 2015  (CN) .......................... 2015 1 0463392

(51) Int. Cl.
*H04L 9/08* (2006.01)
*H04L 9/32* (2006.01)
*H04L 29/06* (2006.01)

(52) U.S. Cl.
CPC .......... *H04L 9/0852* (2013.01); *H04L 9/0858* (2013.01); *H04L 9/3242* (2013.01); *H04L 63/061* (2013.01); *H04L 9/08* (2013.01); *H04L 63/18* (2013.01)

(58) Field of Classification Search
CPC ..... H04L 9/08; H04L 9/04; H04L 9/32; H04L 9/0852; H04L 9/3242; H04L 9/3263; H04L 9/042; H04L 9/06; H04L 63/08; H04L 63/028; H04L 63/18
See application file for complete search history.

(56) References Cited

U.S. PATENT DOCUMENTS

| | | | |
|---|---|---|---|
| 7,496,203 B2 | 2/2009 | Choi et al. | |
| 7,864,958 B2 | 1/2011 | Harrision et al. | |
| 7,889,868 B2 | 2/2011 | Wellbrock et al. | |
| 8,340,298 B2 | 12/2012 | Gelfond et al. | |
| 8,483,394 B2 | 7/2013 | Nordholt et al. | |
| 8,639,927 B2 | 1/2014 | Choi et al. | |

(Continued)

FOREIGN PATENT DOCUMENTS

| | | |
|---|---|---|
| CN | 102281136 | 12/2011 |
| CN | 102946313 | 2/2013 |

(Continued)

Primary Examiner — Ali S Abyaneh
Assistant Examiner — Shaqueal D Wade

(57) ABSTRACT

An authentication method for a QKD process includes: a sender selects a basis for preparing authentication information according to an algorithm in an algorithms library, and respectively applies different wavelengths to send quantum states of control information and data information according to a preset information format; a receiver filters the received quantum states, employs a basis of measurement corresponding to the algorithm to measure the authentication information quantum state, sends reverse authentication information when the measurement result is in line with the algorithm, and terminates the distribution process otherwise. In addition, the sender terminates the distribution process when its local authentication information is inconsistent with the reverse authentication information.

20 Claims, 13 Drawing Sheets

(56) References Cited

U.S. PATENT DOCUMENTS

| | | |
|---|---|---|
| 8,639,932 B2 | 1/2014 | Wiseman et al. |
| 8,650,401 B2 | 2/2014 | Wiseman et al. |
| 8,681,982 B2 | 3/2014 | Wiseman et al. |
| 8,683,192 B2* | 3/2014 | Ayling ............... H04L 9/0858 380/256 |
| 8,693,691 B2 | 4/2014 | Jacobs |
| 8,929,554 B2 | 1/2015 | Hughes et al. |
| 9,137,020 B1 | 9/2015 | Fraser |
| 9,148,225 B2 | 9/2015 | Lowans et al. |
| 9,184,912 B2 | 11/2015 | Harrington |
| 2004/0109564 A1 | 6/2004 | Cerf et al. |
| 2007/0192598 A1* | 8/2007 | Troxel ............... H04L 9/0852 713/168 |
| 2008/0144833 A1 | 6/2008 | Matsumoto |
| 2008/0144836 A1 | 6/2008 | Sanders et al. |
| 2009/0106553 A1 | 4/2009 | Wang |
| 2009/0175452 A1 | 7/2009 | Gelfond et al. |
| 2009/0268901 A1 | 10/2009 | Lodewyck et al. |
| 2011/0126011 A1 | 5/2011 | Choi et al. |
| 2011/0170690 A1 | 7/2011 | Shpantzer |
| 2011/0280397 A1 | 11/2011 | Patwar et al. |
| 2013/0083926 A1 | 4/2013 | Hughes et al. |
| 2013/0315395 A1* | 11/2013 | Jacobs ............... H04L 9/0852 380/278 |
| 2014/0254798 A1 | 9/2014 | Brodsky et al. |
| 2015/0222619 A1 | 8/2015 | Hughes et al. |
| 2016/0149700 A1 | 5/2016 | Fu et al. |
| 2016/0248586 A1* | 8/2016 | Hughes ............... H04L 9/0852 |

FOREIGN PATENT DOCUMENTS

| | | |
|---|---|---|
| CN | 104270247 | 1/2015 |
| WO | 2011059306 | 5/2011 |
| WO | 2013048674 | 4/2013 |
| WO | 2014035696 | 3/2014 |

* cited by examiner

| authentication control information | authentication information | key control information | key information |
|---|---|---|---|

$\lambda^2$  $\lambda^1$  $\lambda^3$  $\lambda^1$

FIG. 2

| authentication control information 00000 | authentication information | key control information 11111 | key information |
|---|---|---|---|
| $\lambda^2$ | $\lambda^1$ | $\lambda^2$ | $\lambda^1$ |

FIG. 3

AUTHENTICATION METHOD, DEVICE AND SYSTEM FOR QUANTUM KEY DISTRIBUTION PROCESS

CLAIM OF PRIORITY

The present application claims the benefit of Chinese Patent Application No. 201510463392.X filed Jul. 31, 2015 to Fu, Yingfang, which is incorporated by reference and in its entirety.

TECHNICAL FIELD

The present application relates to the technical field of authentication, in particular, to an authentication method for a quantum key distribution (QKD) process. The present invention further relates to two additional authentication methods and corresponding devices, as well as an authentication system for the QKD process.

BACKGROUND ART

To ensure network security, authentication is an important measure that can guarantee the authenticity of communication participants, the integrity of information, and the reliability of a source, which also prevents attacks resulting from illegal activities—such as falsifying information, altering data, and delaying communications. In cryptography, private-key cryptosystems and public-key cryptosystem are generally used to ensure the security, integrity, and non-repudiation of identity information, and provide a defense against identity impersonation attacks in communications. Quantum cryptography is an overlapping area of quantum mechanics and cryptography, and provides security ensured by fundamental principles of quantum mechanics, and which is irrelevant to the computing power and storage capacity of an attacker. Also, quantum cryptography has been proven to possess unconditional security and detectability from eavesdroppers. However, traditional quantum key distribution protocols do not provide an effective authentication mechanism; thus, it may be subject to man-in-the-middle or distributed denial of service (DDoS) attacks during the distribution process.

With respect to the above problems, two solutions have been presented as possible solutions:

(I) M. Dusek et. al holds that it is not necessary to authenticate all classical information during the communication, rather, only the classical information that affects the judgment of quantum state error rate. Thus, M. Dusek proposed a quantum authentication protocol that combines the classical message authentication algorithm, of which the essence is to utilize a classical authentication algorithm to authenticate a classical message as little as possible.

(II) BB84 protocol with authentication. The main differences between this protocol and the original BB84 protocol mainly lie in that some bits in a randomly sent quantum bit string are set as specific authentication bits, the positions of which are determined by authentication keys. Authentication of the communication participants are realized by a basis of measurement represented by the authentication bits and a polarization state of a quantum of light. Quantum state information of the authentication bit cannot be transmitted randomly, but is determined by the authentication key shared by the two participants as per a specific rule. A receiver and a sender sets part of the shared quantum key acquired from every negotiation as the authentication key to realize a dynamic update of the authentication key.

The security of the QKD process can be enhanced to a certain degree by applying the authentication mechanisms provided by the two schemes, but each scheme still has certain defects:

(I) For the M. Dusek scheme, it is vulnerable to man-in-the-middle attack or DDoS attacks due to a limited quantity of authentication keys shared by the communication participants in advance. This scheme does not take full advantage of quantum cryptography, and still applies a classical authentication technology, which leads to the risk of cracking.

(II) Although the BB84 protocol with authentication transmits the shared authentication key information in the form of a quantum state to improve the key distribution security, part of the shared quantum key acquired from every negotiation is required to be applied as the authentication key, which results in a waste of quantum key resources, as this part of the quantum key cannot be used for transaction data encryption.

SUMMARY

Embodiments of the present application provide an authentication method for a QKD process that not only provides a new solution for authentication in the QKD process, but also effectively solves the problems of insecurity and quantum key resource waste in an authentication mechanism applied in existing QKD processes. In addition, the embodiments of the present application further provide two additional authentication methods and corresponding devices, as well as an authentication system for the QKD process.

The present application provides an authentication method for the QKD process, wherein the method is implemented in receiver and sender quantum communication devices involved in the QKD process. In one embodiment, the process is performed when the sender selects a basis for preparing authentication information according to an algorithm in a preset algorithms library, and respectively applies different wavelengths to send quantum states of control information and data information according to the preset information format, wherein the data information comprises authentication information and randomly generated key information. The receiver then filters various received information quantum states according to the different wavelengths and the preset information format, employs a metric corresponding to the same algorithm in the preset algorithms library to measure the authentication information quantum state therein, and sends reverse authentication information that is obtained based on the measurement result to the sender to authenticate the identity of the receiver when the measurement result is in line with the algorithm. In the case the measurement result is not in line with the algorithm, the QKD process is terminated. If successful, the sender generates local authentication information according to the received reverse authentication information and the sent local authentication information, and terminates this QKD process when the local authentication information is inconsistent with the reverse authentication information.

In one or more embodiments, when a measurement result is determined to be in line with the algorithm, the receiver discloses the basis of measurement for measuring the key information quantum state via a pre-determined channel; correspondingly, when the sender determines that the local authentication information is in line with the reserve authentication information, the sender determines a correct basis of measurement of the key information quantum state, screens the initial key; and discloses the correct basis of measurement of the key information quantum state via the pre-determined channel. Correspondingly, after the sender discloses the correct basis of measurement of the key information quantum state, the receiver screens the initial key, and the receiver and the sender together acquire a final shared quantum key through error rate estimation, error correction and privacy amplification.

In one or more embodiments, the receiver and the sender negotiate an algorithm number through a pre-determined channel prior to the selection by the sender of the basis for preparation; and correspondingly, the algorithms applied by the receiver and the sender are selected from their respective preset algorithm libraries according to the negotiated algorithm number.

In an embodiment, the algorithm numbers in the preset algorithm libraries of the receiver and the sender are synchronously transformed according to a preset strategy.

In an embodiment, the algorithm number is cryptographically transmitted with a shared key that is predetermined by the receiver and the sender during an algorithm number negotiation via the pre-determined channel.

In an embodiment, the preset information is formatted such that the authentication information and key information have their own control information as a prefix.

In an embodiment, the wavelength that carries the control information quantum state as the authentication information prefix is different from the wavelength that carries the control information quantum state as the key information prefix.

In an embodiment, the preset information is formatted such that different codes are respectively applied to the control information as the authentication information prefix and the control information as the key information prefix. The different codes are preset by the receiver and the sender, or, alternately, the codes are determined by pre-negotiation via the pre-determined channel. According to further embodiments, the bases for preparing or measuring the control information quantum states by the receiver and the sender are preset by the receiver and the sender, or determined by pre-negotiation via the pre-determined channel.

In an embodiment, the preset information is formatted such that the authentication information and the key information apply the shared control information as prefixes. Correspondingly, the receiver and the sender negotiate the length of the authentication information between the control information and the key information via the pre-determined channel before the sender selects the basis for preparing the authentication information according to the algorithm in the preset algorithms library.

In an embodiment, the reverse authentication information that is obtained according to the measurement result and provided for the sender to authenticate the identity of the receiver comprises: location information about where the receiver selects the receiver authentication key in the measurement result, and a receiver authentication key or a hash value of the receiver authentication key. Correspondingly, local authentication information is generated in the server according to the received reverse authentication information and the sent local authentication information by selecting, in the server, a corresponding sender authentication key from the sent local authentication information according to the received local information, and correspondingly uses the sender authentication key or the hash value of the sender authentication key as the local authentication information.

In an embodiment, the reverse authentication information that is obtained based on the measurement result and provided for the sender to authenticate the identity of the receiver comprises: location information about where the receiver selects the receiver authentication key in the measurement result, the ciphertext of auxiliary authentication information that is locally generated and encrypted with the receiver authentication key, and the hash value of the character string formed by splicing the auxiliary authentication information and the receiver authentication key. Correspondingly, local authentication information is generated in the server according to the received reverse authentication information and the sent local authentication information by selecting, in the server, the corresponding sender authentication key in the sent local authentication information according to the received location information, decrypting the received auxiliary authentication information ciphertext with the sender authentication key to acquire the auxiliary authentication information; calculating the hash value of the character string formed by splicing the acquired auxiliary authentication information and the sender authentication key, and then using the calculated hash value as the local authentication information.

In an embodiment, when the sender determines that the local authentication information is in line with the reserve authentication information, the sender applies the sender authentication key to encrypt a variant of the auxiliary authentication information acquired by decryption; and then transmits the encrypted ciphertext via the pre-determined channel. Correspondingly, the receiver, after receiving the ciphertext, decrypts the received ciphertext with the receiver authentication key; determines whether the decrypted information is in line with the variant of the locally generated auxiliary authentication information; and if not, terminates the QKD process.

In an embodiment, the receiver and the sender perform authentication on opposite-end device with the preset account information via the pre-determined channel before the sender selects the basis for preparing the authentication information according to the algorithm in the preset algorithms library, and terminates the QKD process if any device fails in the authentication.

In an embodiment, the algorithm in the preset algorithms library comprises: selecting the corresponding basis for preparation or basis of measurement according to the location of each bit of authentication information in the data information.

In an embodiment, selecting the corresponding basis for preparation or basis of measurement according to the location of each bit of authentication information in the data information specifically refers to: selecting a corresponding horizontal polarization basis, vertical polarization basis, levorotatory polarization basis, or dextrorotatory polarization basis according to different results of the location information of each bit in the data information mod 4.

In addition, the present invention further provides another authentication method for a QKD process, wherein the method is implemented in a sender quantum communication device involved in the QKD process and comprises the following steps: selecting a basis for preparing authentication information according to an algorithm in a preset algorithms library, and respectively applying different wavelengths to send quantum states of control information and data information to an opposite-end device involved in the QKD process according to a preset information format, wherein the data information comprises authentication information and randomly generated key information; receiving reverse authentication information returned by the opposite-end device; generating local authentication information according to the received reverse authentication information and the sent local authentication information; determining whether the local authentication information is consistent with the reverse authentication information, and terminating the QKD process if not.

In an embodiment, in addition to the reverse authentication information, the information returned by the opposite-end device further comprises a basis of measurement applied for measuring a key information quantum state. Correspondingly, when determining that the local authentication information is consistent with the received reverse authentication information, a correct basis of measurement of the key information quantum state is determined, while the initial key is screened; the correct basis of measurement of the key information quantum state is disclosed via the pre-determined channel; and a final shared quantum key is acquired through error rate estimation, error correction and privacy amplification.

In an embodiment, before the basis for preparing the authentication information is selected according to the algorithm in the preset algorithms library, the following operation is executed: the opposite-end device for an algorithm number is negotiated with via a pre-determined channel; the algorithm in the preset algorithms library is selected according to the negotiated algorithm number; and the basis for preparing the authentication information is selected according to the algorithm.

In an embodiment, the preset information of this authentication method is formatted such that the authentication information and key information have their own control information as prefixes.

In an embodiment, the preset information is presented in a format that comprises the authentication information and the key information having applied the shared control information as prefixes. Correspondingly, the opposite-end device is negotiated with for the length of the authentication information between the control information and the key information via the pre-determined channel before the basis for preparing the authentication information according to the algorithm in the preset algorithms library is selected.

In an embodiment, the received reverse authentication information comprises: location information of a receiver authentication key selected by the opposite-end device and the receiver authentication key or the hash value of the receiver authentication key. Correspondingly, the local authentication information is generated according to the received reverse authentication information and the sent local authentication information by selecting a corresponding sender authentication key from the sent local authentication information according to the received location information, and taking the sender authentication key or the hash value of the sender authentication key as the local authentication information.

In an embodiment, the received reverse authentication information comprises location information of the receiver authentication key selected by the opposite-end device, auxiliary authentication information ciphertext, and the hash value of the character string formed by splicing the auxiliary authentication information and the receiver authentication key. Correspondingly, the local authentication information is generated according to the received reverse authentication information and the sent local authentication information by selecting the corresponding sender authentication key from the sent local authentication information according to the received location information; decrypting the received auxiliary authentication information ciphertext with the sender authentication key to acquire the auxiliary authentication information; calculating the hash value of the character string formed by splicing the acquired auxiliary authentication information and the sender authentication key, and thereafter taking the calculated hash value as the local authentication information.

In an embodiment, the sender authentication key is applied to encrypt a variant of the auxiliary authentication information acquired by decryption; and the encrypted ciphertext is transmitted to the opposite-end device via the pre-determined channel when determining that the local authentication information is consistent with the received reverse authentication information.

Additionally, the present application further provides an authentication device for a QKD process, wherein the device is deployed on a sender quantum communication device involved in the QKD process. In an embodiment, the authentication device comprises: a quantum state sending unit configured to select a basis for preparing authentication information according to an algorithm in a preset algorithms library, and respectively apply different wavelengths to send quantum states of control information and data information to an opposite-end device involved in the QKD process according to a preset information format, wherein the data information comprises authentication information and randomly generated key information; a response information receiving unit configured to receive reverse authentication information returned by the opposite-end device; a local authentication information generating unit configured to generate local authentication information according to the received reverse authentication information and the sent local authentication information; a sender authentication determining unit configured to determine whether the local authentication information is consistent with the reverse authentication information; and a distribution process terminating unit configured to terminate the QKD process when the output result of the sender authentication determining unit is negative.

In an embodiment, in addition to the reverse authentication information, the information received by the response information receiving unit further comprises: a basis of measurement applied for measuring the key information quantum state. In addition, the device further comprises: an initial key screening unit configured to determine a correct basis of measurement of the key information quantum state when the output result of the sender authentication determining unit is yes, and screening the initial key; a correct basis of measurement disclosing unit, configured to disclose the correct basis of measurement of the key information quantum state via a pre-determined channel; and a sender quantum key acquiring unit, configured to acquire a final shared quantum key through error rate estimation, error correction and privacy amplification.

In an embodiment, the device further comprises: an algorithm number negotiating unit, configured to negotiate with the opposite-end device for an algorithm number via the pre-determined channel before the quantum state sending unit is activated. In addition, the quantum state sending unit selects the basis for preparing the authentication information by the following steps: selecting the algorithm in the preset algorithms library according to the algorithm number determined by the algorithm number negotiating unit, and selecting the basis for preparing the authentication information according to the algorithm.

In an embodiment, the preset information format applied by the quantum state sending unit comprises: the authentication information and key information respectively having their own control information as prefixes.

In an embodiment, the preset information format applied by the quantum state sending unit comprises: the authentication information and key information with the shared control information as prefixes; additionally, the device further comprises: an authentication information length negotiation unit, configured to negotiate with the opposite-end device for the length of the authentication information located between the control information and the key information via the pre-determined channel before activating the quantum state sending unit.

In an embodiment, the reverse authentication information received by the response information receiving unit comprises: location information of a receiver authentication key selected by the opposite-end device, the receiver authentication key, or the hash value of the receiver authentication key; and additionally, the local authentication information generating unit is configured to select a corresponding sender authentication key from the sent local authentication information according to the received location information, and correspondingly take the sender authentication key or the hash value of the sender authentication key as the local authentication information.

In an embodiment, the reverse authentication information received by the response information receiving unit comprises: location information of the receiver authentication key selected by the opposite-end device, auxiliary authentication information ciphertext, and the hash value of the character string formed by splicing the auxiliary authentication information and the receiver authentication key; correspondingly, the local authentication information generating unit comprises: a sender authentication key selection subunit configured to select the corresponding sender authentication key in the sent local authentication information according to the received location information; an auxiliary authentication information decryption unit configured to decrypt the received auxiliary authentication information ciphertext with the sender authentication key to acquire the auxiliary authentication information; and a sender hash value calculation unit configured to calculate the hash value of the character string formed by splicing the acquired auxiliary authentication information and the sender authentication key, and then take the calculated hash value as the local authentication information.

In an embodiment, the device further comprises: a variant information encryption unit, configured to apply the sender authentication key to encrypt a variant of the auxiliary authentication information acquired by decryption when the output result of the sender authentication determining unit is positively determined; and a variant information ciphertext sending unit configured to transmit the encrypted ciphertext to the opposite-end device via the pre-determined channel.

Moreover, the present application further provides a third authentication method for a QKD process, wherein the method is implemented in a receiver quantum communication device involved in the QKD process and comprises the following steps: receiving a quantum state sent by an opposite-end device involved in the QKD process; discriminating various received information quantum states according to the pre-agreed different wavelengths and preset information formats; selecting the basis of measurement according to the algorithm that is the same as the opposite-end device and selected from the preset algorithms library; applying the basis of measurement to measure the received authentication information quantum state; determining whether the measurement result is consistent with the selected algorithm; sending reverse authentication information that is obtained based on the measurement result and provided for the opposite-end device to authenticate the identity of receiver quantum communication device to the opposite-end device; and terminating this QKD process if not.

In an embodiment, when determining that the measurement result is in line with the algorithm, the basis of measurement for measuring the key information quantum state via a pre-determined channel is disclosed. Correspondingly, the method further comprises: receiving the correct basis of measurement of the key information quantum state sent by the opposite-end device via a pre-determined channel; screening the initial key, and acquiring a final shared quantum key through error rate estimation, error correction and privacy amplification.

In an embodiment, before receiving the quantum state sent by the opposite-end device involved in the QKD process, the opposite-end device for algorithm number is negotiated with via a pre-determined channel. In addition, the basis of measurement that is the same as the opposite-end device and selected from the preset algorithms library is performed by selecting the algorithm in the preset algorithms library according to the negotiated algorithm number, and selecting the basis of measurement according to the algorithm.

In an embodiment, the step of sending reverse authentication information that is obtained based on the measurement result and provided for the opposite-end device to authenticate the identity of the receiver quantum communication device to the opposite-end device comprises: selecting a receiver authentication key from the measurement result; sending location information of the selected receiver authentication key, and the receiver authentication key or the hash value of the receiver authentication key to the opposite-end device.

In an embodiment, sending reverse authentication information that is obtained based on the measurement result and provided for the opposite-end device to authenticate the identity of the receiver quantum communication device to the opposite-end device comprises: selecting a receiver authentication key from the measurement result; encrypting the locally generated auxiliary authentication information with the receiver authentication key; calculating the hash value of the character string formed by splicing the auxiliary authentication information and the receiver authentication key; and sending location information of the selected receiver authentication key, auxiliary authentication information ciphertext and the hash value to the opposite-end device.

In an embodiment, after sending reverse authentication information that is obtained based on the measurement result and provided for the opposite-end device to authenticate the identity of the receiver quantum communication device to the opposite-end device, the following operations are executed: receiving the auxiliary authentication information variant ciphertext sent by the opposite-end device; decrypting the received ciphertext with the receiver authentication key; determining whether the decrypted information is in line with the variant of the locally generated auxiliary authentication information; and if not, terminating the QKD process.

Correspondingly, the present application further provides an authentication device for a QKD process, wherein the device is deployed on a receiver quantum communication device involved in the QKD process and comprises: a quantum state receiving unit configured to receive a quantum state sent by an opposite-end device involved in the QKD process, and discriminating various received information quantum states according to the pre-agreed different wavelengths and preset information formats; a quantum state measuring unit configured to select the basis of measurement according to the algorithm that is the same as the opposite-end device and selected from the preset algorithms library, and applying the basis of measurement to measure the received authentication information quantum state; a receiver authentication determining unit configured to determine whether the measurement result is consistent with the selected algorithm; a reverse authentication information sending unit configured to send reverse authentication information that is obtained based on the measurement result and provided for the opposite-end device to authenticate the identity of the receiver quantum communication device to the opposite-end device when the output result of the receiver authentication determining unit is positively determined; and a distribution process terminating unit, configured to terminate the QKD process when the output result of the receiver authentication determining unit is negatively determined.

In an embodiment, the device further comprises: a basis of measurement disclosing unit configured to disclose the basis of measurement for measuring the key information quantum state via a pre-determined channel when the output result of the receiver authentication determining unit is positively determined. Correspondingly, the device further comprises: a correct basis of measurement receiving unit configured to receive the correct basis of measurement of the key information quantum state transmitted by the opposite-end device via the pre-determined channel; and a receiver quantum key acquisition unit configured to screen the initial key, and acquire a final shared quantum key through error rate estimation, error correction and privacy amplification.

In an embodiment, the device further comprises: an algorithm number negotiating unit configured to negotiate with the opposite-end device for algorithm number via the pre-determined channel before the quantum state receiving unit is activated; correspondingly, the quantum state measurement unit selects the basis of measurement of the authentication information by selecting the algorithm from the preset algorithms library according to the negotiated algorithm number, and selecting the basis of measurement according to the algorithm.

In an embodiment, the reverse authentication information sending unit comprises: a receiver authentication key selection subunit configured to select a receiver authentication key from the measurement result; a first information sending execution subunit configured to send location information of the selected receiver authentication key, and the receiver authentication key or the hash value of the receiver authentication key to the opposite-end device.

In an embodiment, the reverse authentication information sending unit comprises: a receiver authentication key selection subunit configured to select a receiver authentication key from the measurement result; an auxiliary authentication information encryption subunit configured to encrypt the locally generated auxiliary authentication information with the receiver authentication key; a receiver hash value calculation subunit configured to calculate the hash value of the character string formed by splicing the auxiliary authentication information and the receiver authentication key; and a second information sending execution subunit configured to send location information of the selected receiver authentication key, auxiliary authentication information ciphertext or the hash value to the opposite-end device.

In an embodiment, the device further comprises: a variant information ciphertext receiving unit configured to receive an auxiliary authentication information variant ciphertext sent by the opposite-end device after the reverse authentication information sending unit finishes transmission; a variant information ciphertext decryption unit configured to decrypt the received ciphertext with the receiver authentication key; a variant information determining unit configured to determine whether the decrypted information is in line with the variant of the locally generated auxiliary authentication information, and if inconsistent, activating the distribution process terminating unit.

Additionally, the present application further provides an authentication system for a QKD process, comprising an authentication device deployed on a sender quantum communication device according to any of the solutions as described above, and an authentication device deployed on a receiver quantum communication device according to any of the solutions as described above.

Compared with the prior art, the present application has the following advantages:

The authentication method for a QKD process provided by the present invention comprises the following steps: a sender selects a basis for preparing authentication information according to an algorithm in an algorithms library, and respectively applies different wavelengths to send quantum states of control information and data information containing the authentication information and key information according to the preset information format; a receiver filters various received quantum states according to the different wavelengths and the preset information formats, and employs a corresponding basis of measurement to measure the authentication information quantum state therein, and sends reverse authentication information when the measurement result is in line with the algorithm, otherwise terminates this QKD process; and the sender terminates this QKD process when determining that local authentication information is inconsistent with the received reverse authentication information. According to the above embodiment, the receiver and the sender alternate or filter authentication information quantum states in key information quantum states by controlling information and different wavelengths, selecting the basis for preparation and the basis of measurement of the authentication information quantum state on the basis of the algorithm in the preset algorithms library, and conducting authentication according to the judgment whether the obtained identity information is in line with the algorithm. Therefore, a dynamic authentication mechanism can be realized in the QKD process, the validity of the identity of the communication participants can be confirmed in real time, man-in-the-middle and DDoS attacks can be effectively defended, and the security of the QKD process can be guaranteed; furthermore, the waste of quantum key resources can be prevented by generating authentication information dynamically according to the algorithm.

BRIEF DESCRIPTION OF DRAWINGS

FIG. 2 illustrates a schematic diagram of a first information format as provided in embodiments of the present invention.

FIG. 3 illustrates a schematic diagram of a second information format as provided in embodiments of the present invention.

DETAILED DESCRIPTION OF THE INVENTION

Specific details will be provided below to facilitate the full understanding of the present invention. However, the present invention can also be implemented by many other means in addition to what has been described herein. It is to be understood that a person skilled in the art can extrapolate from the present invention without departing from the spirit and principles of the present invention, and that the present invention is not limited by the specific embodiments disclosed below.

The present invention provides an authentication method for a QKD process, two additional authentication methods for the QKD process and corresponding devices, as well as an authentication system for the QKD process respectively, all of which will be presented in the embodiments below.

Figure 1:
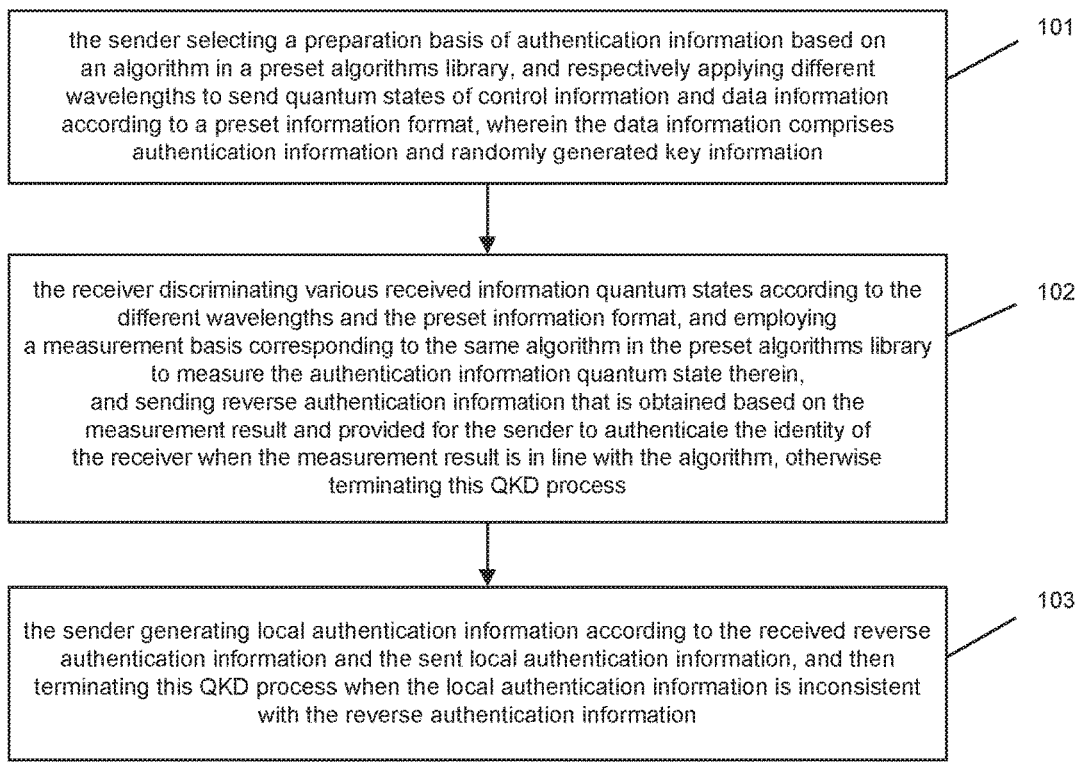
FIG. 1 illustrates a flow diagram of an authentication method for a QKD process as provided in embodiments of the present invention.

Referring to FIG. 1 which illustrates a flow diagram of an authentication method for the QKD process as provided in the embodiments herein, wherein the method is implemented in receiver and sender quantum communication devices involved in the QKD process. Before the specific steps of the embodiment are elaborated, a brief description on the embodiments and the receiver and sender quantum communication devices involved in various embodiments will be provided.

According to one or more embodiments, the identity of the quantum communication devices of both the receiver and the sender involved in the distribution process is dynamically authenticated during QKD. The device used to select a basis for preparation to transmit a quantum state to an opposite-end device is called the sender quantum communication device herein, or "sender" for short; a corresponding device operable to select a basis of measurement to measure the received quantum state is called the receiver quantum communication device, or "receiver" for short.

In one or more embodiments, the QKD process comprises the following stages: the sender sends the quantum state; the receiver measures the quantum state; the sender and the receiver compare measurement and screen an initial key, and perform error rate estimation, error correction and privacy amplification. According to an embodiment of present invention, dynamic authentication is realized in the above process. In one or more embodiments, after the sender interweaves authentication information in the sent quantum state, the receiver and the sender can authenticate their identities mutually by measuring the quantum state, and continue the following process flow of all stages, such as performing a basis of measurement comparison upon the completion of authentication. Alternately, the process for mutual authentication can be interwoven in all stages. While each of the above two methods are feasible, the second may be preferable under certain circumstances due to the simplification of the interactive process to improve the execution efficiency. The following embodiments will be described according to the second method, and the detailed description on the present invention is presented further below.

According to one or more embodiments, the authentication method for a QKD process comprises the following steps:

At step 101, the sender selects a basis for preparing authentication information according to an algorithm in a preset algorithms library, and respectively, applies different wavelengths to send quantum states of control information and data information according to a preset information format. In one or more embodiments, under the preset information format, the data information comprises authentication information and randomly generated key information.

In one or more embodiments, before the sender sends the quantum state to the receiver via a quantum channel, the sender and the receiver conducts a mutual authentication process via a pre-determined or classical/traditional channel, and negotiate an algorithm number with respect to bases selected by the two parties, and start a QKD process (also called a quantum key negotiation process) upon the completion of the above two processes. These two processes will be specified below.

1) Performing an authentication process between the sender and receiver via a classical channel. According to an embodiment, the authentication can be dynamically conducted during the QKD process. Moreover, in order to prevent the QKD process from being activated by or between illegal quantum communication devices, the present invention provides the following solution: before the sender activates a QKD process, the quantum communication devices of the sender and the receiver authenticate the identity of the respective opposite-end device via the pre-determined channel, and the ensuing QKD process can be continued only if the devices of the two parties succeed with the authentication.

To be specific, the initiator in the quantum key negotiation process, e.g., the sender in the present invention, can send a quantum key negotiation request first. The request contains account information of the sender, and the account information can contain identity information and a signature certificate of the sender. After receiving the account information, the opposite-end device involved in the quantum key negotiation process (e.g., the receiver), authenticates the certificate with the identity information therein, and returns a response information, including the account information of the receiver to the sender if the authentication succeeds; if the authentication fails, the opposite-end device terminates this QKD process.

Similarly, after receiving the account information of the receiver, the sender can authenticate the identity of the receiver by the same method, and execute the QKD process if authentication succeeds, otherwise terminate this QKD process.

2) Performing algorithm number (such as a serial number) negotiation between the sender and receiver via the classical channel In the case of authentication (e.g., when both the receiver and the sender successfully completes the above authentication process), the sender and receiver can negotiate an algorithm number to be employed. In an embodiment provided by the present invention, in order to effectively defend against a man-in-the-middle attack and/or DDoS attack, the receiver and the sender can preset the same algorithms library. During each QKD process, the sender dynamically determines the basis for preparing the authentication information quantum state according to the algorithm in the algorithms library, and the receiver dynamically determines the basis of measurement (e.g., a metric or standard) of the authentication information quantum state according to the algorithm in the algorithms library. In order to accurately achieve authentication, the receiver and the sender need to apply the same algorithm. In one or more embodiments, the receiver and the sender can apply the same preset rules to select the algorithm in the algorithms library in every QKD process. For example, the algorithm can be sequentially selected according to a preset sequence table, as long as such a selection can ensure the receiver and the sender apply the same algorithm.

In order to ensure the consistency of the applied algorithm on both sides, the receiver and the sender can determine the number of the jointly applied algorithm through the negotiation process before activating the QKD process. Since the negotiation process is completed via a pre-determined channel, in order to prevent an attacker from acquiring the algorithm number and then speculating the specific algorithm according to the algorithm number, the following two methods can be applied:

a) The receiver and the sender synchronously transforms the algorithm numbers (such as serial number) in their respective algorithm libraries according to the preset strategy, they can then employ a plaintext mode during algorithm number negotiation. In one or more embodiments, the receiver and the sender can periodically conduct a synchronous transformation of the algorithm numbers in their algorithm libraries according to the preset period, or trigger a synchronous transformation immediately before each activation of the QKD process. Various algorithms can be applied to the specific number transformation method, as long as they can ensure that the same algorithms in the transformed algorithm libraries of the receiver and the sender have the same numbers. For example, in the algorithm libraries, if there are five algorithms of which the original numbers are 1, 2, 3, 4, and 5 respectively, after transformation, the numbers of the five algorithms in the algorithm libraries of the two parties are synchronously adjusted to 2, 3, 4, 5 and 1.

b) In the case where the receiver and the sender do not have synchronous transformation mechanisms as specified in a), an encrypted transmission mode can be applied during algorithm number negotiation. For example, the sender encrypts the algorithm number to be used with a shared key preset by the two parties and sends the encrypted algorithm number to the receiver, and then the receiver will apply the same preset shared key for decryption, so as to acquire the applied algorithm number, and return a confirmation reply to the sender. In one or more embodiments, the algorithm number can also be encrypted with a quantum key acquired in the last quantum key negotiation process.

As can be seen from the above description, an attacker cannot obtain specific algorithm contents applied by the receiver and the sender even if the above negotiation information is acquired by monitoring the pre-determined channel, as a result of the application of an anonymous method of the algorithm number negotiation to conduct algorithm negotiation, and synchronously transforming the algorithm number or applying the encrypted key transmission. Also, a man-in-middle attack or DDoS attack can be prevented when the receiver and the sender apply the same algorithm.

The following QKD process can be activated upon completion of the above interactive process. During this step, the sender selects the basis for preparing authentication information according to an algorithm (such as the algorithm determined by the negotiated algorithm number) in a preset algorithms library, and respectively applies different wavelengths to send quantum states of control information and data information according to a preset information format, wherein the data information comprises authentication information and randomly generated key information, and the sending process is completed via the quantum channel.

In one or more embodiments, the preset algorithms library may contain various different algorithms, for example, the corresponding basis for preparing (for the sender) or the basis of measurement (for the receiver) may be selected according to the location of each bit of authentication information in the data information. In a specific embodiment, the preset algorithms library comprises selecting a corresponding horizontal polarization basis, vertical polarization basis, levorotatory polarization basis, or dextrorotatory polarization basis according to different results of the location information of each bit in the data information mod 4. In one or more embodiments, if some bit in the authentication information is located in the l bit in the data information, the basis for preparation and the basis of measurement corresponding to quantum state of that bit satisfy the following conditions:

$$f(l) = \begin{cases} \text{horizontal polarization } H, & l \bmod 4 = 0 \\ \text{vertical polarization } V, & l \bmod 4 = 1 \\ +45° \text{ Polarization}+, & l \bmod 4 = 2 \\ -45° \text{ Polarization}-, & l \bmod 4 = 3 \end{cases}$$

One specific example of the algorithm in the preset algorithms library has been provided above. In an embodiment, the algorithm, or other algorithms different from this algorithm can be included in the preset algorithms library. The embodiment of the present invention can be realized provided that the receiver and the sender select a basis for preparation and a basis of measurement of the authentication information quantum state by applying the same algorithm in the preset algorithms library, which falls within the scope of the present invention.

The sender selects the basis (i.e., a preparation basis) for preparing authentication information based on the said method, and sends the quantum states of control information and data information (including authentication information and key information) to the receiver. To prevent the attacker from conducting targeted monitoring, the quantum states of all data information are sent by applying the same wavelength—namely, the authentication information quantum state and the key information quantum state apply the same wavelength. In order to facilitate the receiver to filter the authentication information quantum state from the key information quantum state in the received quantum state so as to select the correct basis of measurement for detection, the wavelength that carries the control information quantum state is different from the one that carries the data information quantum state. Different wavelengths can be preset by the receiver and the sender, or determined by negotiation via the pre-determined channel before the QKD process is activated.

Based on the above agreed upon wavelength characteristics, the receiver and the sender can preset the same information format. The sender sends the quantum states of the control information, the key information and the authentication information according to the format, while the receiver filters various information quantum states according to the agreed wavelength and the information format. Various definition methods can be applied for the information formats as long as the receiver can correctly distinguish them. Several specific examples will be presented below.

Example 1: when the authentication information and the key information respectively have their respective control information as prefixes (respectively hereinafter referred to as: authentication control information and key control information), and the wavelengths that carry the two control information quantum states are different. Please refer to the schematic diagram for information format provided in FIG. 2. The wavelength that carries the data information (including authentication information and key information) quantum state is $\lambda_1$, the wavelength of the authentication control information quantum state is $\lambda_2$, and the wavelength that carries the key control information quantum state is $\lambda_3$, $\lambda_1$, $\lambda_2$ and $\lambda_3$ are mutually different. $\lambda_2$ and $\lambda_3$ can be preset by the receiver and the sender, or determined by negotiation before the QKD process is activated. With this method, the sender can randomly select the quantum states of the two control information, while the receiver can directly distinguish the authentication control information and the key control information according to the wavelength.

Example 2: the authentication information and the key information respectively have their respective control information as prefixes, and the codes of the two control information are different. Please refer to the schematic diagram for information format as shown in FIG. 3. The wavelength that carries data information (including authentication information and key information) is $\lambda_1$, the wavelength that carries the authentication control information quantum state and the wavelength that carries the key control information quantum state are both $\lambda_2$ (that different from but the codes of these two types of control information are different. For instance, 00000 is a code of the authentication control information while 11111 is a code of the key control information. The different codes are preset by the receiver and the sender, or determined by negotiation via the pre-determined channel before the QKD process is activated. The bases for preparing or measuring the above two control information quantum states by the receiver and the sender can be preset by the receiver and the sender, or determined by negotiation via the pre-determined channel before the QKD process is activated.

Figure 4:
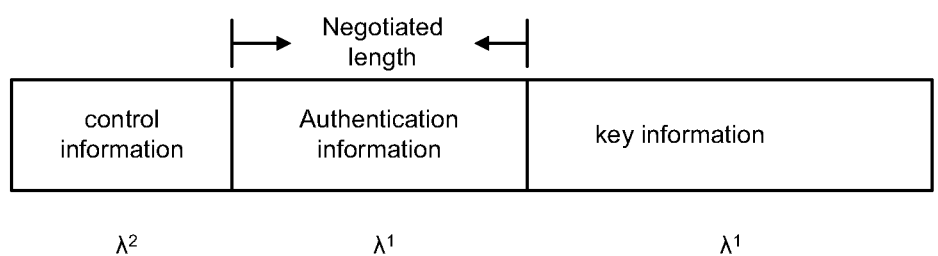
FIG. 4 illustrates a schematic diagram of a third information format as provided in embodiments of the present invention.

Example 3: the authentication information and the key information have the shared control information as prefixes. Please refer to the schematic diagram for information format as shown in FIG. 4. The wavelength that carries the data information (including authentication information and key information) is $\lambda_1$, wherein the authentication information and the key information share the same control information prefix; the wavelength that carries the control information quantum state is $\lambda_2$, which is different from $\lambda_1$. With this method, the receiver can distinguish the control information from the data information according to the wavelength, and the sender can randomly select the control information quantum state. The length of the authentication information between the control information and the key information should be agreed by the receiver and the sender such that the receiver can correctly distinguish the authentication information from the key information in the data information authentication. In one or more embodiments, the length of the authentication information can be preset by the receiver and the sender, or determined by negotiation via the pre-determined channel before the QKD process is activated.

It is to be noted that only a part of the information format has been provided in the above examples and related figures. In one or more implementations, each information format can be repeated multiple times and connected in series. For instance, the information format provided in Example 3 may be expanded to include one or more of: control information |authentication information|key information|control information|authentication information |key information. Other information formats different from the above three examples can also be applied, as long as the control information and the data information apply different wavelengths, and the receiver can distinguish various information in the received quantum state according to the agreed wavelength characteristics and information format, all of which are within the scope of the present invention.

In this step, the sender sends the quantum states of the control information, authentication information and key information according to the wavelength characteristics and the information formats agreed with the receiver. For the sake of clarity, the information format in Example 3 will be illustrated below.

For instance, the sender sends the quantum state of a binary bit string with the length of n at the times $t_1, t_2 \ldots t_n$. The binary bit string is as shown below:

$$X_1, X_2 \ldots X_i, X_{i+1} \ldots X_{i+m}, X_{i+m+1} \ldots X_n$$

the binary bit string contains three parts, with control information as the first part, authentication information as the second part, and key information the third part. The control information is a randomly selected binary bit string with the length of i. The authentication information is an authentication bit string, of which the length m can be determined by the sender and the receiver in advance through negotiation via the pre-determined channel, and determined by the basis of preparation corresponding to the algorithm selected from the algorithms library. The key information is a randomly generated binary bit string, with the length of n-m-i.

The sender sends the code quantum state:

$$(|\varphi_{j_1}^{x_1}\rangle, |\varphi_{j_2}^{x_2}\rangle \ldots |\varphi_{j_i}^{x_i}\rangle, |\varphi_{j_{i+1}}^{x_{i+1}}\rangle \ldots |\varphi_{j_{i+m}}^{x_{i+m}}\rangle, |\varphi_{j_{i+m+1}}^{x_{i+m+1}}\rangle \ldots |\varphi_{j_n}^{x_n}\rangle)$$

( )
of the above binary bit string to the receiver at the times $t_1, t_2, \ldots t_n$. The string $j_1, j_2, \ldots j_i, j_{i+1} \ldots j_{i+m}, j_{i+m+1}, \ldots j_n$ is a basis for preparation sequence applied by the sender, in which $j_1, j_2, \ldots j_i$ is a random quantum state basis for preparation corresponding to the bit string of the control information, with the wavelength of $\lambda_2$. The string $j_{i+1} \ldots j_{i+m}$ is a quantum state basis for preparing the authentication information bit string selected according to the algorithm. The string $j_{i+m+1}, \ldots j_n$ is a random quantum state basis for preparation corresponding to the key information bit string. The wavelengths of the authentication information bit string and the key information bit string are both $\lambda_1$, which is different from $\lambda_2$.

According to step 102 of this example, the receiver can distinguish the control information from the data information based on the wavelength, distinguish the authentication information and the key information in the data information based on the length m, and apply the basis of measurement sequence $k_{i+1} \ldots k_{i+m}, k_{i+m+1} \ldots k_n$ to measure the received data information quantum state, in which $k_{i+1} \ldots k_{i+m}$ is a basis of measurement, selected in conformity with the algorithm that is the same as that of the sender, and corresponding to the authentication information quantum state. The sequence $k_{i+m+1} \ldots k_n$ is a random quantum state basis of measurement corresponding to the key information quantum state.

In one or more embodiments, the sender selects the authentication bit string basis for preparation according to the algorithm in the algorithms library, and applies different wavelengths to send the quantum states of the control information and the data information (including authentication information and key information), thereby facilitating in the receiver the ability to distinguish, and have the ability to effectively defend against man-in-middle and DDoS attacks during the QKD process. Furthermore, the authentication information is generated by an algorithm-based manner, thereby preventing the waste of quantum key resources.

At step 102, the receiver filters various received information quantum states according to the different wavelengths and the preset information format, and employs a basis of measurement corresponding to the same algorithm in the preset algorithms library to measure the authentication information quantum state therein. Thereafter, the receiver sends reverse authentication information that is obtained based on the measurement result and provided for the sender to authenticate the identity of the receiver when the measurement result is in line with the algorithm, and terminates the QKD process otherwise.

Figure 5:
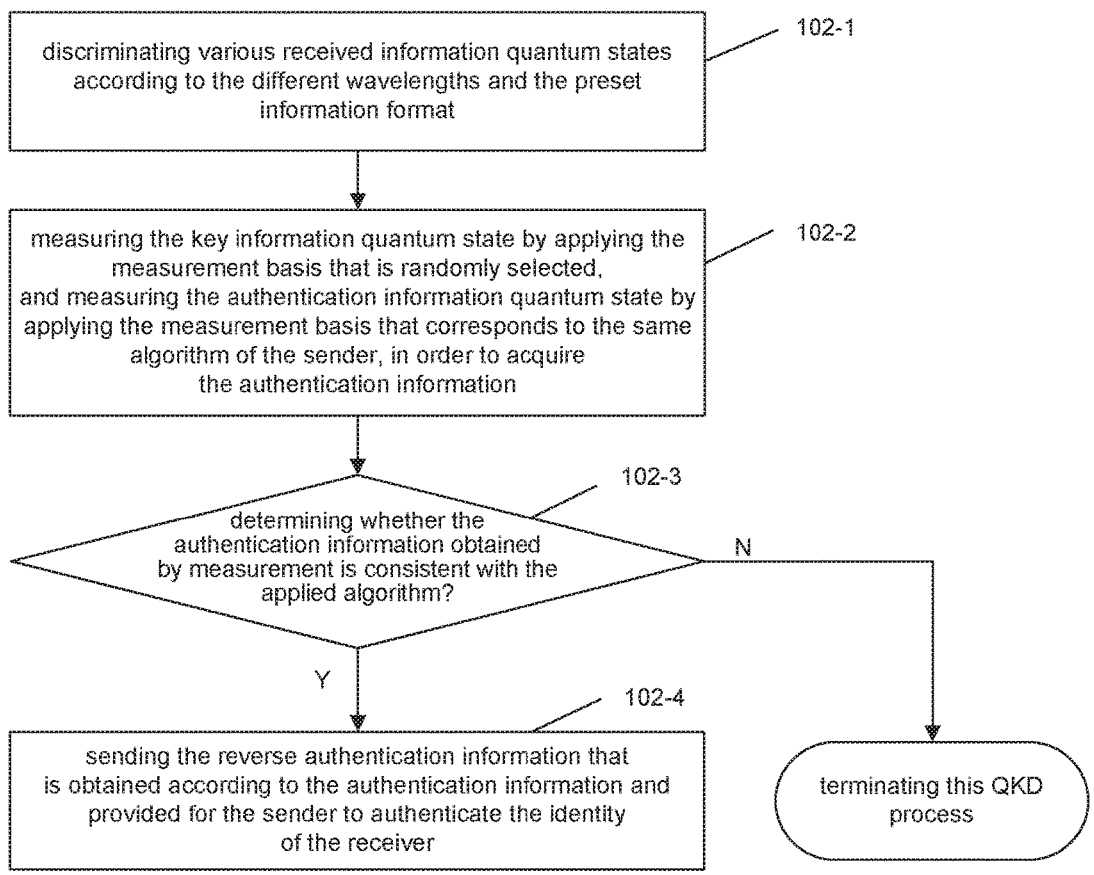
FIG. 5 illustrates a process flowchart for a receiver executing authentication as provided in embodiments of the present invention.

In this step, the receiver not only completes the conventional measurement on the key quantum state according to the QKD protocol (for instance, BB84 protocol), but also completes the authentication on the identity of the sender according to the measurement result of the authentication quantum state information. This procedure comprises Steps 102-1 to 102-4, which will be described in combination with FIG. 5.

Step 102-1: differentiating various received information quantum states according to the different wavelengths and preset information formats.

In this step, for the various information quantum states received from the quantum channel, the receiver can apply the wavelength characteristics and the information format pre-agreed with the sender to filter the quantum states of control information, authentication information and key information therein. In an embodiment, the quantum states of control information and data information can be filtered according to different wavelengths, and the quantum states of authentication information and key information can be further filtered in combination with the preset information format.

For example, as the sender and receiver have preset the wavelength characteristics and the information format as described in Example 1 in Step 101, if the receiver receives the quantum states with wavelength of $\lambda_2$, the receiver can determine whether the quantum states correspond to the authentication control information quantum states, determine the subsequently received quantum states with wavelength of $\lambda_1$ as the authentication information quantum states, and then apply the basis of measurement corresponding to the same algorithm of the sender for measurement. If the quantum states with wavelength of $\lambda_3$ is received, then it can be determined that the subsequently received quantum states with wavelength of $\lambda_1$ is the key information quantum states, then the measurement can be made by applying the basis of measurement that is randomly selected.

According to another example, as the sender and receiver have pre-agreed upon the wavelength characteristics and the information format as described in Example 2 in Step 101, if the receiver receives the quantum states with a wavelength of $\lambda_2$, he can determine whether the quantum states are the control information quantum states, then make the measurement by applying the basis of measurement pre-agreed with the sender (preset or determined through negotiation). Then, by comparing the measurement result with the pre-agreed code value, the receiver is able to determine the type of the received control information type: either authentication control information, or key control information. When the quantum states with wavelength of $\lambda_1$ are subsequently received, the measurement can be made by applying the basis of measurement corresponding to the type.

In terms of wavelength characteristics and information format described in Example 3 in Step 101, and wavelength characteristics and information formats adopted by other senders, the receiver can also filter various information quantum states with the same method.

At Step 102-2, the key information quantum state is measured by applying the basis of measurement that is randomly selected, and the authentication information quantum state is also measured by applying the basis of measurement that corresponds to the same algorithm of the sender, in order to acquire the authentication information.

With respect to the key information quantum state, the measurement can be made in accordance with the basis of measurement which is randomly selected according to the QKD protocol (for instance, BB84) so as to acquire the original measurement result of the quantum key information.

As for the part of authentication information quantum state, the measurement can be made in accordance with the basis of measurement that corresponds to the same algorithm of the sender. The sender and the receiver can preset the same algorithms library. In each QKD process, the receiver can select the algorithm in the preset algorithm's library by applying the same preset rule of the sender, or negotiate with the sender on the applied algorithm number prior to the activation of the QKD process, so as to ensure the applied algorithm is the same as that of the sender. Thereafter, the received authentication information quantum state can be measured by applying the basis of measurement selected according to the algorithm to acquire the measurement result (i.e., the authentication information obtained by measurement).

In consideration of the possible attenuation of the quantum channel, the periods of time when no photon is detected can be omitted during measurement, so that only the information obtained by measurement is retained as the measurement result of the authentication information quantum state.

At step 102-3: determining whether the authentication information obtained by measurement is consistent with the applied algorithm, and if so, the process proceeds to Step 102-4, whereas the QKD process is terminated if not.

Since the sender and the receiver preset the same algorithms library, and follow the same algorithm in the algorithms library to select the basis for preparation and basis of measurement of authentication information quantum state, the authentication information obtained by the receiver through measurement is consistent with the expected information corresponding to the selected algorithm.

With respect to the receiver, by determining that the authentication information obtained through measurement is consistent with the corresponding expected information, the selection by the server of the authentication information quantum state can also be confirmed to be consistent with the receiver, since only a sender with an authorized identity can acquire the algorithm. Accordingly, it can be confirmed that the authentication by the sender is successful.

In one or more embodiments, the measurement results of several quantum states may be inconsistent with the expected results in a process of quantum channel transmission, due to factors such as noise interference. For such cases, the sender is considered to have failed the authentication, and the QKD process is terminated, which will cause the unnecessary decrease in the QKD amount. In consideration of the above situation and the needs for defending against man-in-the-middle and DDoS attacks, a threshold can be set such that, if the difference between the expected information corresponding to the selected algorithm and the authentication information obtained by the receiver through measurement is less than the preset threshold (for instance, if the number of bits for the authentication information obtained through measurement inconsistent with the excepted information is less than the preset threshold), the receiver can consider the server to have successfully completed the authentication.

At step 102-4, providing the reverse authentication information that is obtained according to the authentication information to the sender to authenticate the identity of the receiver.

At step 102-3, the receiver has already authenticated the identity of the sender. Accordingly, the receiver needs to prove its own identity legitimacy to the sender. In one or more embodiments, the receiver provides reverse authentication information and the sender authenticates the identity of the receiver according to the information to realize the above authentication function.

The reverse authentication information refers to the information that is acquired by the receiver from the authentication information obtained through measurement, and provided to the sender to authenticate the identity of the receiver. For instance, the receiver can select part of the information from authentication information obtained through measurement as the receiver authentication key IDkey, and send location information of the selected key and the receiver authentication key as the reverse authentication information to the sender, who selects the corresponding sender authentication key from the sent local authentication information according to the received location information. If the sender authentication key is consistent with the received receiver authentication key, a successful authentication is achieved.

Figure 6:
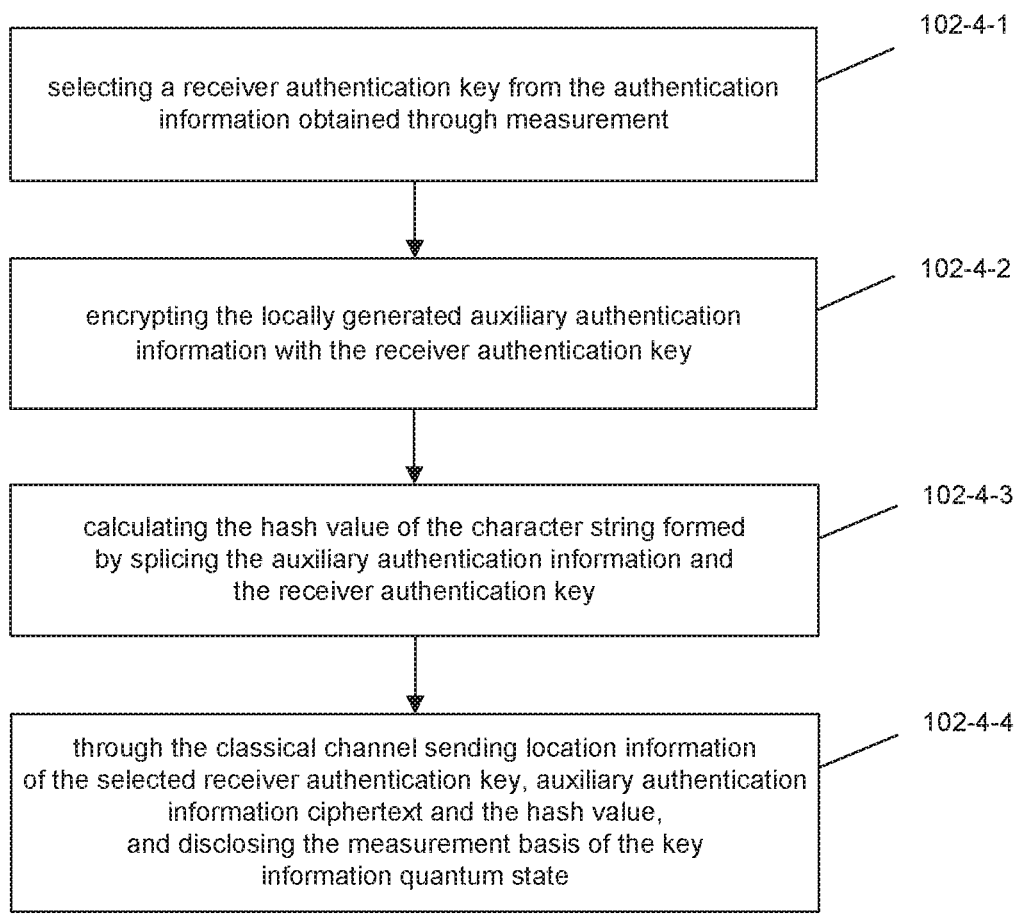
FIG. 6 illustrates a process flowchart for a receiver sending reverse authentication information as provided in embodiments of the present invention.

In one or more embodiments, the above method can be altered. For instance, the location information and the hashed value of the receiver authentication key can be included in the reverse authentication information sent by the receiver, and the corresponding sender can perform the comparison and authentication via the hashed value of the sender authentication key. With this method, the receiver identity can also be authenticated. The following is an embodiment of the method, comprising Step 102-4-1 to Step 102-4-4, which will be described as follows in combination with FIG. 6.

At step 102-4-1, a receiver authentication key is selected from the authentication information obtained through measurement.

In one embodiment, the authentication information obtained through measurement can be taken directly as the receiver authentication key IDkey. To further improve the security of such a process, instead of directly using the authentication information obtained through measurement as the IDkey, one or more bits located at different locations are randomly selected from the authentication information, and the bit string composed by the selected bits is used as the receiver authentication key IDkey.

At step 102-4-2, the locally generated auxiliary authentication information is encrypted with the receiver authentication key.

In one or more embodiments, the auxiliary authentication information m may be a natural number randomly selected by the receiver, or a random number generated by applying a random number generating algorithm or tools. This step encrypts the auxiliary authentication information m by applying the previously selected receiver key IDkey.

At step 102-4-3, the hash value of the character string is calculated by splicing the auxiliary authentication information and the receiver authentication key.

A preset hash algorithm, for instance, SHA-1, SHA-2, or SHA-3, is applied to calculate the hash value of the character string formed by splicing the auxiliary authentication information m and the receiver IDkey. In other embodiments, other hash algorithms not listed here can also be applied, provided that the sender applies the same algorithm to authenticate the receiver identity.

At step 102-4-4, location information of the selected receiver authentication key, auxiliary authentication information ciphertext and the hash value are sent through a pre-determined channel, and the basis of measurement of the key information quantum state is also disclosed.

After performing the above Steps 102-4-1 to 102-4-3, the location information of the selected receiver authentication key, the encrypted auxiliary authentication information and the calculated hash value can be combined as the reverse authentication information and sent together to the sender via the pre-determined channel. The sender authenticates its identity by referring to this information.

Moreover, the basis of measurement for measuring the key information quantum state by the receiver can also be disclosed via the pre-determined channel in accordance with the QKD protocol.

At step 103, the sender generates local authentication information according to the received reverse authentication information and the sent local authentication information, and terminates this QKD process when the local authentication information is inconsistent with the reverse authentication information.

Since the receiver acquires the reverse authentication information from the authentication information obtained through measurement, and both the sender and the receiver apply the same algorithm to select a basis for preparation and a basis of measurement of the authentication information, the authentication information for both parties is consistent. On this basis, by comparing the local authentication information with the received reverse authentication information, the sender can determine whether the identity of the receiver who sends the reverse authentication information is legal.

Figure 7:
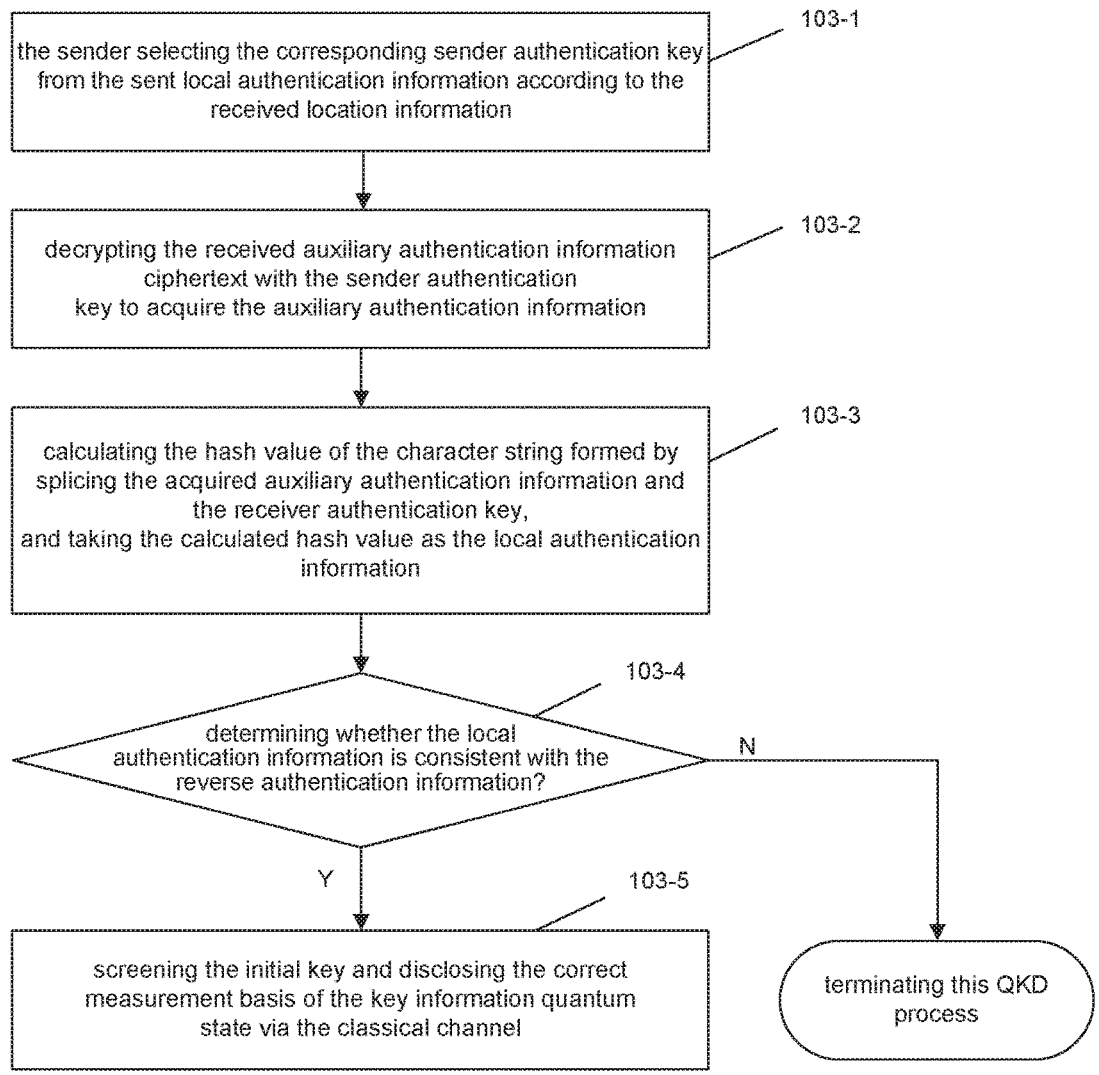
FIG. 7 illustrates a processing flowchart for a sender executing authentication as provided in embodiments of the present invention.

In one embodiment, the sender can execute the corresponding comparison operation according to the content of the received reverse authentication information. The sender can complete the authentication of the receiver through the following steps from 103-1 to 103-5, which are further described in combination with FIG. 7.

At step 103-1, the sender selects the corresponding sender authentication key from the sent local authentication information according to the received location information.

The sender receives the basis of measurement and the reverse authentication information disclosed by the receiver via the pre-determined channel. In one embodiment, the reverse authentication information comprises at least one of: location information, auxiliary authentication information ciphertext, and hash value calculated from the auxiliary authentication information and the receiver authentication key.

According to the location information, the sender selects the bits corresponding to the location information from the authentication information sent in step 101, so as to acquire the sender authentication key, i.e., the sender IDkey.

At step 103-2, the received auxiliary authentication information ciphertext is decrypted with the sender authentication key to acquire the auxiliary authentication information.

By using the sender IDkey selected in step 103-1, the auxiliary authentication information m can be obtained by decrypting the received auxiliary authentication information ciphertext.

At step 103-3, the hash value of the character string can be calculated by splicing the acquired auxiliary authentication information and the receiver authentication key, and using the calculated hash value as the local authentication information.

By splicing the auxiliary authentication information m acquired in Step 103-2 with the sender IDkey acquired in Step 103-1 in the form of character string, and applying the same hash algorithm as the receiver, the hashed value of the spliced character string can be calculated and taken as the local authentication information for authenticating the receiver identity.

At step 103-4, the local authentication information is evaluated to determine whether the information is consistent with the reverse authentication information; if so, step 103-5 is executed, while the QKD process is terminated if not.

The hash value calculated in Step 103-3 is then evaluated to determine whether the hash value is consistent with the corresponding value in the received reverse authentication information. If so, i.e., the local authentication information is in line with the reverse authentication information, this indicates that the receiver is using the right IDkey (e.g., the same key as that of the sender IDkey). When generating the reverse authentication information, the sender can decrypt the same auxiliary authentication information m as the receiver and further calculate the same hash value. Since only the receiver with an authorized identity can apply the basis of measurement corresponding to the same algorithm of the sender to measure authentication information quantum state and acquire the correct receiver IDkey, it can therefore be determined that the receiver is successful with the authentication, and step 103-5 can be further executed. If not, i.e., if the information is not in line with each other, the so-called receiver may be considered as a man-in-middle or an attacker, in which case, the QKD process shall be terminated.

Step 103-5: screening the initial key and disclosing the correct basis of measurement of the key information quantum state via the classical channel.

If the sender determines that the receiver identity is legal, it can, according to the procedure of the QKD protocol, compare the basis of measurement disclosed by the receiver with the basis for preparation used by itself, and pick out the correct basis of measurement, then screen the initial key according to the correct measurement base, and disclose the correct basis of measurement to the receiver via the pre-determined channel.

At this point, through the above Steps 101 to 103, the receiver has verified the sender identity by determining the consistency between the authentication information obtained through measurement and the algorithm selected from the preset algorithms library; while the sender has verified the receiver identity by comparing the reverse authentication information provided by the receiver with the local authentication information. When both receiver and sender succeed with the authentication, the subsequent key distribution process can be performed according to the procedure according to the QKD protocol.

To further ensure the security of the key distribution process, this embodiment also adds the processing flow for authentication and data encryption in the subsequent distribution process, and this embodiment will be described as follows for further description.

1) The sender uses the sender IDkey to encrypt a variant of the auxiliary authentication information m acquired by decryption, and then transmits the encrypted ciphertext via a pre-determined channel.

In Step 103, the sender acquires the decrypted auxiliary authentication information m. After having verified the identity of the receiver, the sender can apply the sender IDkey to encrypt a variant of the auxiliary authentication information m acquired by decryption, and then send the encrypted ciphertext information when disclosing the correct basis of measurement of the key information quantum state via the pre-determined channel. The correct basis of measurement information of the key information quantum state disclosed by the sender can apply the sender IDkey for encryption.

The variant of the auxiliary authentication information refers to the information generated based on the auxiliary authentication information. For instance, it can be the auxiliary authentication information itself, or the result obtained by applying a preset mathematical transformation method to process the auxiliary authentication information, for example: m+1. The receiver and sender can preset the same variant generation algorithm or function so as to ensure the generated variant information is consistent as for the same auxiliary authentication information m.

2) After the receiver receives the correct basis of measurement and the ciphertext, the receiver verifies the sender identity again by decrypting the ciphertext.

First, the receiver applies the sender IDkey to decrypt the received ciphertext so as to acquire the variant information of the auxiliary authentication information m.

Then, it is determined whether the decrypted variant information of m is in line with the variant of the locally generated auxiliary authentication information m. Initially, the auxiliary authentication information m is locally generated by the receiver (please refer to Step 102-4-2), and sent to the sender via the pre-determined channel in an encrypted form. After decrypting the information, the sender encrypts the variant of the information by applying the sender IDkey and sends it to the receiver. If the result from decryption by the receiver is consistent with the variant of the auxiliary authentication information that is originally locally generated by the receiver, it is determined that not only the sender can successfully decrypt and restore m, but also the applied sender IDkey and the variant generation algorithm or function are consistent with that of the receiver, so that the receiver is able to once again verify the sender's identity. Moreover, it also can be determined that the correct basis of measurement of key information quantum state disclosed by the sender via the pre-determined channel is reliable.

Therefore, if the above results are positively determined, the receiver can screen the initial key according to the correct basis of measurement disclosed via pre-determined channel, and disclose the measurement result of partial key quantum state via the pre-determined channel so as to conduct subsequent error rate estimation. If, however the above result is negatively determined, it is determined that the receiver identity is not reliable, so the QKD process can be terminated.

3) The receiver and the sender acquire a final shared quantum key through error rate estimation, error correction and privacy amplification.

In the above 2), if the receiver successfully verifies the sender identity another time, and has completed the operation for screening the initial key, the sender and the receiver can conduct the subsequent process in accordance with the QKD protocol, including a bit error rate estimation, error correction and privacy amplification. The above procedures are completed by the negotiation between both the sender and the receiver through the pre-determined channel, in which all relevant information can be encrypted and decrypted by applying the corresponding IDkey of the sender and the receiver.

In summary, based on the authentication method provided in the embodiment, the receiver and the sender interweave or filter the authentication information quantum states in key information quantum states through control information and different wavelengths, selects a basis for preparation and basis of measurement of the authentication information quantum state on the basis of the algorithm in the preset algorithms library, and conducts authentication according to the determination of whether the measured identity information is in line with the algorithm. Therefore, a dynamic authentication mechanism with quantum state zero-knowledge proof can be realized in the QKD process, and the validity of the identity of the communication participant can be confirmed in real time, so as to effectively defend against man-in-the-middle and DDoS attacks, and guarantee the security of the QKD process. Furthermore, a waste of quantum key resources can be prevented because the authentication information is dynamically generated in an algorithm-based manner.

Figure 8:
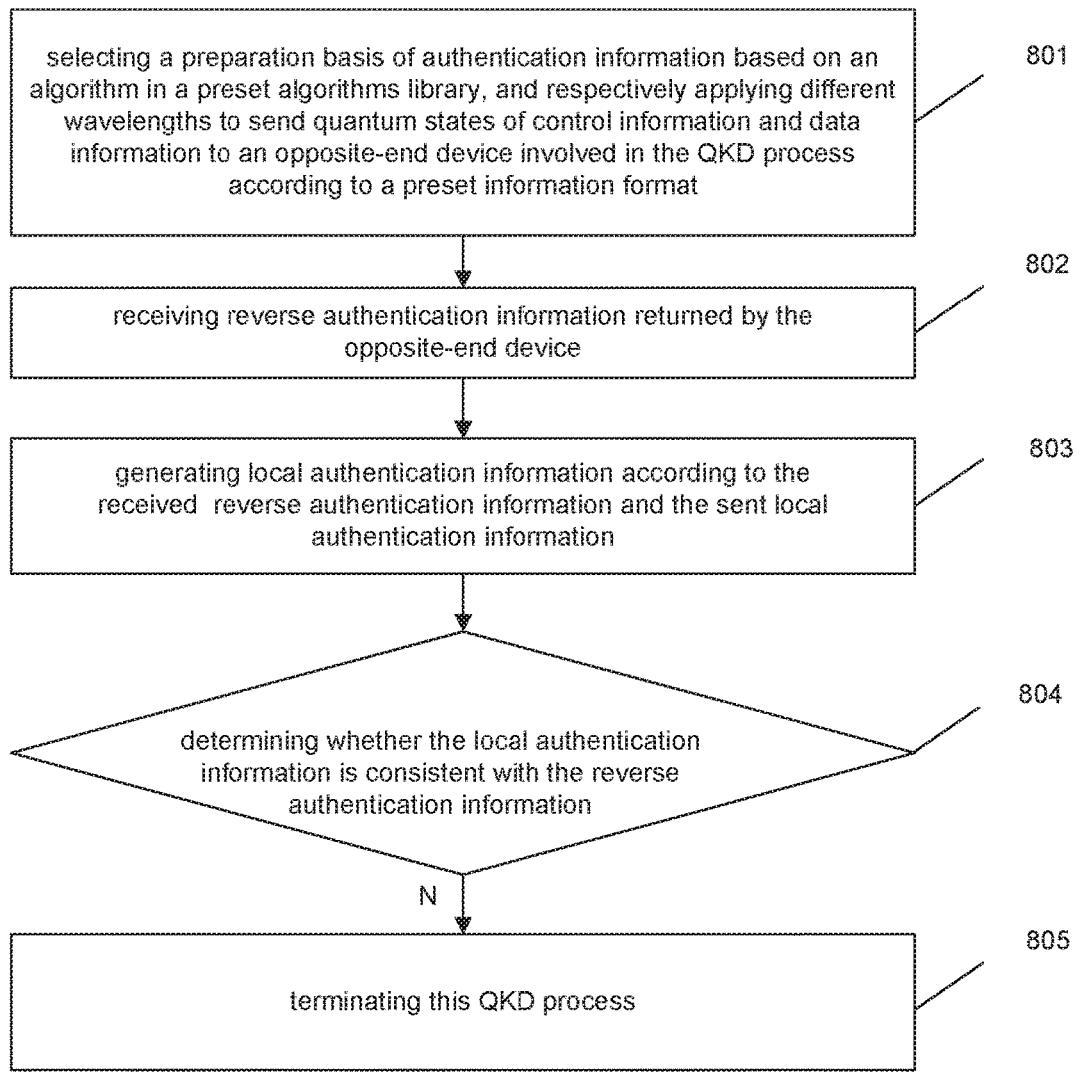
FIG. 8 illustrates a flow diagram of another authentication method for a QKD process as provided in embodiments of the present invention.

In addition, the present invention further provides another authentication method for a QKD process, wherein the method is implemented in sender quantum communication devices involved in the QKD process. Please refer to FIG. 8 which illustrates a flow diagram of another authentication method for QKD process as provided in the embodiments of the present invention. For the sake of brevity, the description for identical steps previously provided is herein omitted, and the differences will be described specifically as follows. The method comprises the following steps:

At step 801, a basis for preparing authentication information is selected according to an algorithm in a preset algorithms library, and different wavelengths are respectively applied to send quantum states of control information and data information to an opposite-end device involved in the QKD process according to a preset information format, wherein the data information comprises authentication information and randomly generated key information.

Prior to the execution of this step, negotiation for the algorithm number can be made with the opposite-end device via a pre-determined channel. Correspondingly, the step of selecting the basis for preparing authentication information according to the algorithm in the preset algorithms library comprises selecting the algorithm from the preset algorithms library according to the negotiated algorithm number, and selecting the basis for preparing authentication information according to the algorithm.

The preset information format can comprise the authentication information and key information respectively having their own control information as prefixes, and can also include the authentication information and the key information applying the shared control information as prefixes. If this information format is applied, the negotiation for the length of the authentication information between the control information and the key information can be made with the opposite-end device via the pre-determined channel.

At step 802, reverse authentication information returned by the opposite-end device is received.

Two examples of the received reverse authentication information are provided as follows:

As a first example, the reverse authentication information can comprise location information of the receiver authentication key selected by the opposite-end device, the receiver authentication key, or the hash value of the receiver authentication key.

Alternately, the received reverse authentication information can comprise location information of the receiver authentication key selected by the opposite-end device, auxiliary authentication information ciphertext, and the hash value of the character string formed by splicing the auxiliary authentication information and the receiver authentication key.

In addition to the reverse authentication information, the information returned by the opposite-end device can further can comprise a basis of measurement applied for measuring key information quantum state.

At step 803, local authentication information can be generated according to the received reverse authentication information and the sent local authentication information.

If the first kind of reverse authentication information is received in step 802, this step can select a corresponding sender authentication key from the sent local authentication information according to the received location information, and correspondingly use the sender authentication key or the hash value of the sender authentication key as the local authentication information.

If the second kind of reverse authentication information is received in Step 802, this step can perform the following: a corresponding sender authentication key is selected from the sent local authentication information according to the received location information, the auxiliary authentication information is acquired by decrypting the received auxiliary authentication information ciphertext with the sender authentication key, the hash value of the character string formed is calculated by splicing the acquired auxiliary authentication information and the sender authentication key, and this calculated harsh value is used as the local authentication information.

At step 804, the local authentication information is evaluated to determine whether the information is consistent with the reverse authentication information, and if not, step 805 is performed.

If the determining result of step 804 is positive, the sender authentication key can be applied to encrypt a variant of the auxiliary authentication information acquired by decryption, and the encrypted ciphertext can be transmitted to the opposite-end device via the pre-determined channel. The subsequent process can also be performed according to the QKD protocol by determining a correct basis of measurement of the key information quantum state, screening the initial key, disclosing the correct basis of measurement of the key information quantum state via the pre-determined channel, and acquiring a final shared quantum key through error rate estimation, error correction and privacy amplification.

At step 805, the QKD process is terminated.

Figure 9:
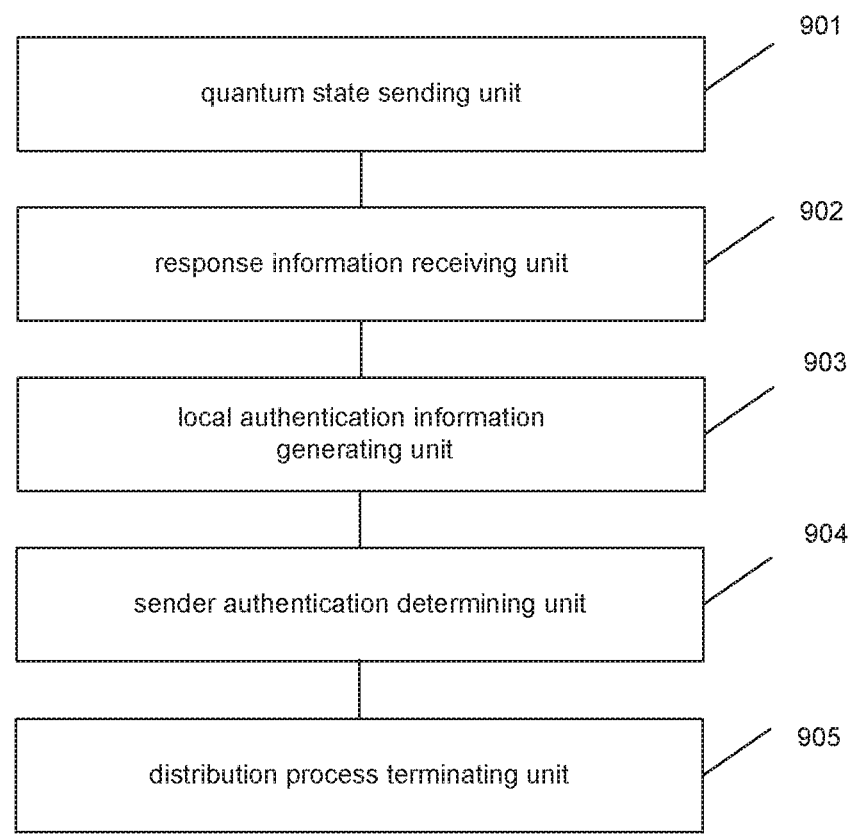
FIG. 9 illustrates a schematic diagram of an authentication device for a QKD process as provided in embodiments of the present invention.

In one or more embodiments, another authentication method for a QKD process is provided, and correspondingly, the present invention further provides an authentication device for a QKD process, wherein the device is deployed on a sender quantum communication device involved in the QKD process. Referring now to FIG. 9, a schematic diagram of an authentication device for the QKD process is depicted, as provided in the embodiments of the present invention. As the device embodiment is basically similar to the method embodiment, the description of the device embodiment is relatively simple, and for the related part, the descriptions of the method embodiment shall be referred to. The following device embodiment is only for illustrative purposes.

The authentication device for a QKD process as provided in this embodiment comprises: a quantum state sending unit 901 configured to select a basis for preparing authentication information according to an algorithm in a preset algorithms library, and respectively apply different wavelengths to send quantum states of control information and data information to an opposite-end device involved in the QKD process according to a preset information format. In one or more embodiments, the data information comprises authentication information and randomly generated key information. As depicted, the authentication device also comprises a response information receiving unit 902 configured to receive the reverse authentication information returned by the opposite-end device; a local authentication information generating unit 903 configured to generate local authentication information according to the received reverse authentication information and the sent local authentication information; a sender authentication determining unit 904 configured to determine whether the local authentication information is consistent with the received reverse authentication information; and a distribution process terminating unit 905 configured to terminate the QKD process when the output result of the sender authentication determining unit is negatively determined.

In an embodiment, in addition to the reverse authentication information, the information received by the response information receiving unit further comprises: a basis of measurement applied for measuring the key information quantum state. Additionally, the device further comprises: an initial key screening unit configured to determine a correct basis of measurement of the key information quantum state when the output result of the sender authentication determining unit is positive, and to screen the initial key; a correct basis of measurement disclosing unit, configured to disclose the correct basis of measurement of the key information quantum state via a pre-determined channel; and a sender quantum key acquiring unit configured to acquire a final shared quantum key through error rate estimation, error correction and privacy amplification.

In an embodiment, the device further comprises: an algorithm number negotiating unit, configured to negotiate with the opposite-end device for algorithm number via the pre-determined channel before the quantum state sending unit is activated. Additionally, the quantum state sending unit selects the basis for preparing the authentication information by selecting the algorithm in the preset algorithms library according to the algorithm number determined by the algorithm number negotiating unit, and selecting the basis for preparing the authentication information according to the algorithm.

In an embodiment, the preset information format applied by the quantum state sending unit is such that the authentication information and key information respectively have their own control information as prefixes.

In an embodiment, the preset information format applied by the quantum state sending unit consists of the authentication information and key information applying the shared control information as prefixes. Correspondingly, the device further comprises: an authentication information length negotiation unit, configured to negotiate with the opposite-end device for the length of the authentication information located between the control information and the key information via the pre-determined channel before activating the quantum state sending unit.

In an embodiment, the reverse authentication information received by the response information receiving unit comprises location information of a receiver authentication key selected by the opposite-end device, the receiver authentication key or the hash value of the receiver authentication key; and correspondingly, the local authentication information generating unit is configured to select a corresponding sender authentication key from the sent local authentication information according to the received location information, and correspondingly use the sender authentication key or the hash value of the sender authentication key as the local authentication information.

In an embodiment, the reverse authentication information received by the response information receiving unit comprises location information of the receiver authentication key selected by the opposite-end device, auxiliary authentication information ciphertext, and the hash value of the character string formed by splicing the auxiliary authentication information and the receiver authentication key. Correspondingly, the local authentication information generating unit comprises a sender authentication key selection subunit, configured to select the corresponding sender authentication key in the sent local authentication information according to the received location information; an auxiliary authentication information decryption unit, configured to decrypt the received auxiliary authentication information ciphertext with the sender authentication key to acquire the auxiliary authentication information; and a sender hash value calculation unit, configured to calculate the hash value of the character string formed by splicing the acquired auxiliary authentication information and the sender authentication key, and use the calculated hash value as the local authentication information.

In an embodiment, the device further comprises a variant information encryption unit, configured to apply the sender authentication key to encrypt a variant of the auxiliary authentication information acquired by decryption when the output result of the sender authentication determining unit is positively determined; and a variant information ciphertext sending unit, configured to transmit the encrypted ciphertext to the opposite-end device via the pre-determined channel.

Figure 10:
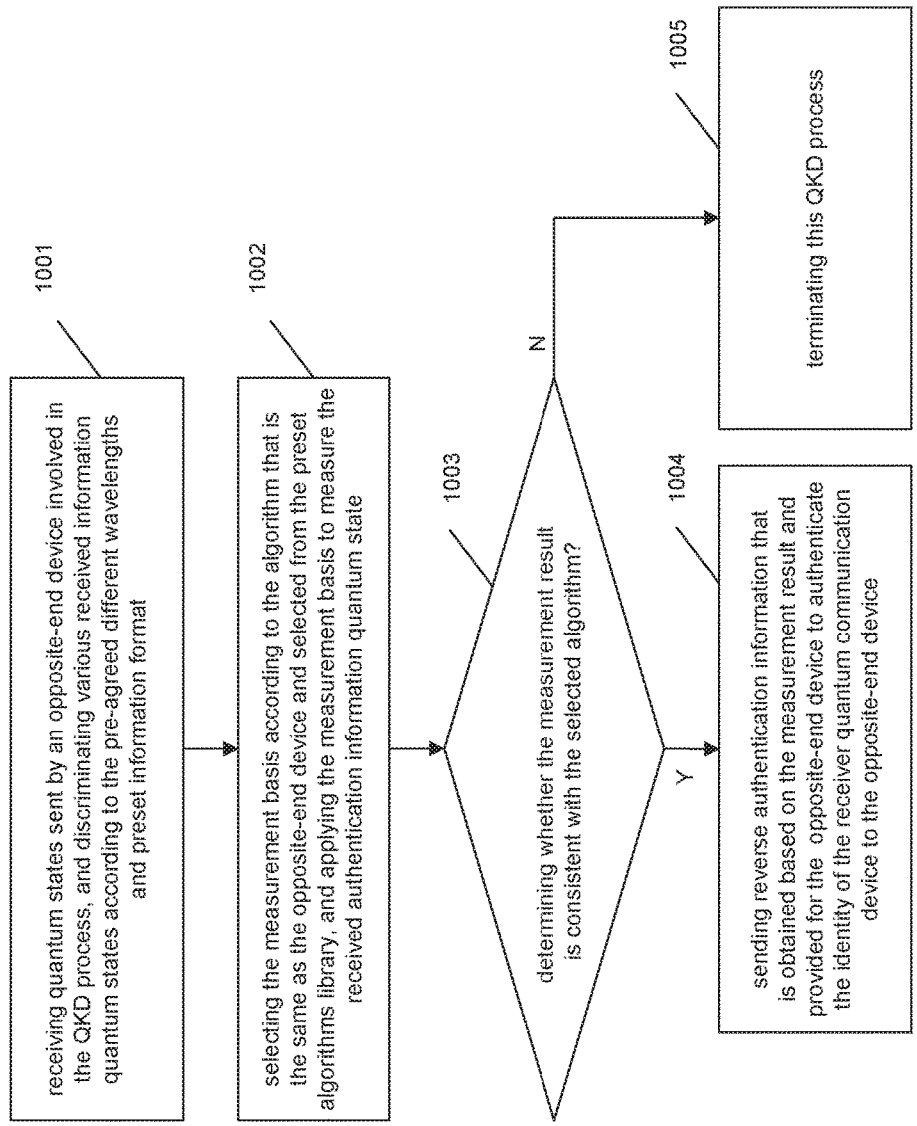
FIG. 10 illustrates a flow diagram of the third authentication method for a QKD process as provided in embodiments of the present invention.

The present invention further provides a third authentication method for a QKD process, wherein the method is implemented in a receiver quantum communication device involved in the QKD process. Please refer to FIG. 10, which illustrates a flow diagram of a third authentication method for QKD process as provided in the embodiments of the present invention. With respect to the steps similar to those already described above for the previously discussed embodiments, repetitive descriptions will be omitted herein, and the differences will be described specifically as follows. The method comprises the following steps:

At step 1001, quantum states sent by an opposite-end device involved in the QKD process is received, and various received information quantum states are filtered according to the pre-agreed different wavelengths and preset information formats.

Prior to the performance of this step, the negotiation for the algorithm number can be made with the opposite-end device via a pre-determined channel. Correspondingly, selecting the basis of measurement according to the algorithm that is the same as the opposite-end device and selected from the preset algorithms library can be performed by selecting the algorithm from the preset algorithms library according to the negotiated algorithm number, and selecting the basis of measurement according to the algorithm.

At step 1002, the basis of measurement according to the algorithm is selected from the preset algorithms library, and the basis of measurement is applied to measure the received authentication information quantum state.

At step 1003, the measurement result is evaluated to determine whether the result consistent with the selected algorithm; if so, the process proceeds to step 1004, while if not, the process proceeds directly to step 1005.

At step 1004, the reverse authentication information that is obtained based on the measurement result is provided to the opposite-end device to authenticate the identity of the receiver quantum communication device to the opposite-end device.

In one or more embodiments, the receiver authentication key is selected from the measurement results, and location information of the selected receiver authentication key, and the receiver authentication key or the hash value of the receiver authentication key is sent to the opposite-end device.

In one or more embodiments, the reverse authentication information can be provided to the opposite-end device by selecting the receiver authentication key from the measurement results, encrypting the locally generated auxiliary authentication information with the receiver authentication key, calculating the hash value of the character string formed by splicing the auxiliary authentication information and the receiver authentication key, and sending the location information of the selected receiver authentication key, the auxiliary authentication information ciphertext and the hash value to the opposite-end device.

In addition to sending the reverse authentication information to the opposite-end device, the basis of measurement for measuring the key information quantum state can also be disclosed via the pre-determined channel.

In one or more embodiments, sending the reverse authentication information may also include receiving the auxiliary authentication information ciphertext sent by the opposite-end device, decrypting the received ciphertext with the receiver authentication key, and determining whether the decrypted information is in line with the variant of the locally generated auxiliary authentication information. If the above determining result is positively determined, the receiver can screen the initial key according to the received correct basis of measurement and acquire the final shared quantum key through the process of error rate estimation, error correction and privacy amplification. However, if the above determining result is negatively determined, the receiver's identity is determined to be not reliable, so the QKD process can be terminated.

At step 1005, the QKD process is terminated.

Figure 11:
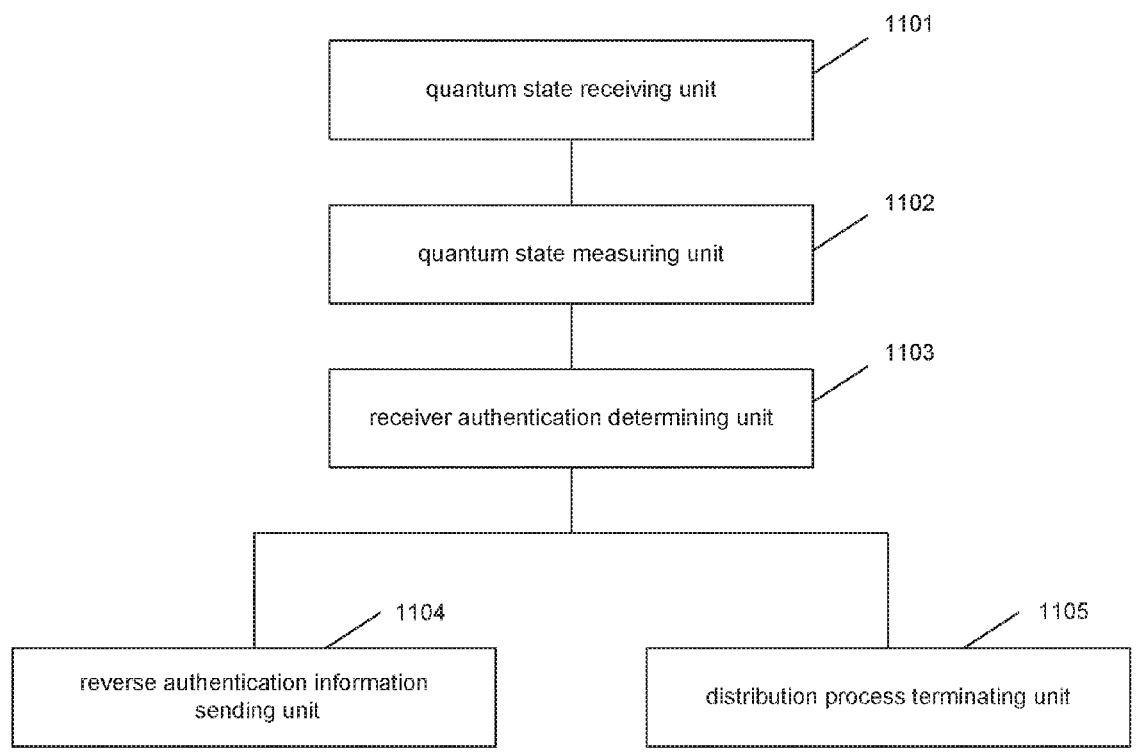
FIG. 11 illustrates a schematic diagram of an authentication device for a QKD process as provided in embodiments of the present invention.

In one or more embodiments, a third authentication method for a QKD process is provided, and correspondingly, the present invention further provides an authentication device for a QKD process wherein the device is deployed on the receiver quantum communication device involved in the QKD process. Please refer to FIG. 11 which illustrates a schematic diagram of an authentication device for the QKD process as provided in the embodiments of the present invention. As the device embodiment is similar to the method embodiment described above, reference can be made for related portions in the device embodiment to the descriptions of the corresponding method embodiment. The following device embodiment is only for illustrative purposes.

The authentication device for a QKD process as provided in this embodiment comprises: a quantum state receiving unit 1101, configured to receive a quantum states sent by an opposite-end device involved in the QKD process, and to filter various received information quantum states according to the pre-agreed different wavelengths and preset information format; a quantum state measuring unit 1102, configured to select the basis of measurement according to the algorithm that is the same as the opposite-end device and selected from the preset algorithms library, and apply the basis of measurement to measure the received authentication information quantum state; a receiver authentication determining unit 1103, configured to determine whether the measurement result is consistent with the selected algorithm; a reverse authentication information sending unit 1104, configured to send reverse authentication information that is obtained based on the measurement result and provided for the opposite-end device to authenticate the identity of the receiver quantum communication device to the opposite-end device when the output result of the receiver authentication determining unit is positively determined; and a distribution process terminating unit 1105, configured to terminate the QKD process when the output result of the receiver authentication judgment unit is negatively determined.

In an embodiment, the device further comprises: a basis of measurement disclosing unit, configured to disclose the basis of measurement for measuring the key information quantum state via a pre-determined channel when the output result of the receiver authentication determining unit is positively determined. Correspondingly, the device further comprises: a correct basis of measurement receiving unit, configured to receive the correct basis of measurement of the key information quantum state transmitted by the opposite-end device via the pre-determined channel; and a receiver quantum key acquisition unit, configured to screen the initial key, and acquire a final shared quantum key through error rate estimation, error correction and privacy amplification.

In an embodiment, the device further comprises: an algorithm number negotiating unit, configured to negotiate with the opposite-end device for algorithm number via the pre-determined channel before the quantum state receiving unit is activated. Correspondingly, the quantum state measurement unit selects the basis of measurement of the authentication information by selecting the algorithm from the preset algorithms library according to the negotiated algorithm number, and selecting the basis of measurement according to the algorithm.

In an embodiment, the reverse authentication information sending unit comprises a receiver authentication key selection subunit, configured to select a receiver authentication key from the measurement result; a first information sending execution subunit, configured to send location information of the selected receiver authentication key, and the receiver authentication key or the hash value of the receiver authentication key to the opposite-end device.

In an embodiment, the reverse authentication information sending unit comprises: a receiver authentication key selection subunit, configured to select a receiver authentication key from the measurement result; an auxiliary authentication information encryption subunit configured to encrypt the locally generated auxiliary authentication information with the receiver authentication key; a receiver hash value calculation subunit, configured to calculate the hash value of the character string formed by splicing the auxiliary authentication information and the receiver authentication key; and a second information sending execution subunit, configured to send location information of the selected receiver authentication key, auxiliary authentication information ciphertext and the hash value to the opposite-end device.

In an embodiment, the device further comprises: a variant information ciphertext receiving unit, configured to receive an auxiliary authentication information variant ciphertext sent by the opposite-end device after the reverse authentication information sending unit finishes transmission; a variant information ciphertext decryption unit, configured to decrypt the received ciphertext with the receiver authentication key; a variant information determining unit, configured to determine whether the decrypted information is in line with the variant of the locally generated auxiliary authentication information, and if inconsistent, to activate the distribution process terminating unit.

Figure 12:
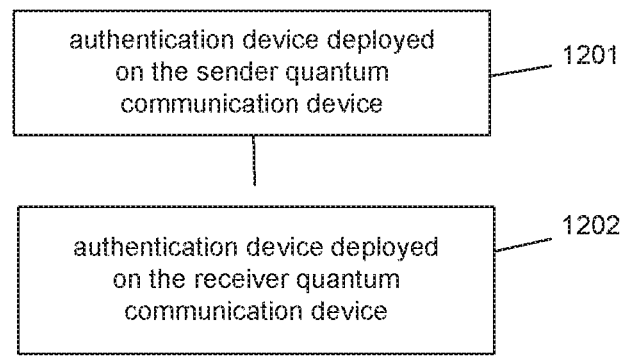
FIG. 12 illustrates a schematic diagram of an authentication system for a QKD process as provided in embodiments of the present invention.

Additionally, the present invention further provides an authentication system for a QKD process as shown in FIG. 12, comprising an authentication device 1201 deployed on the sender quantum communication device, and an authentication device 1202 deployed on the receiver quantum communication device.

Figure 13:
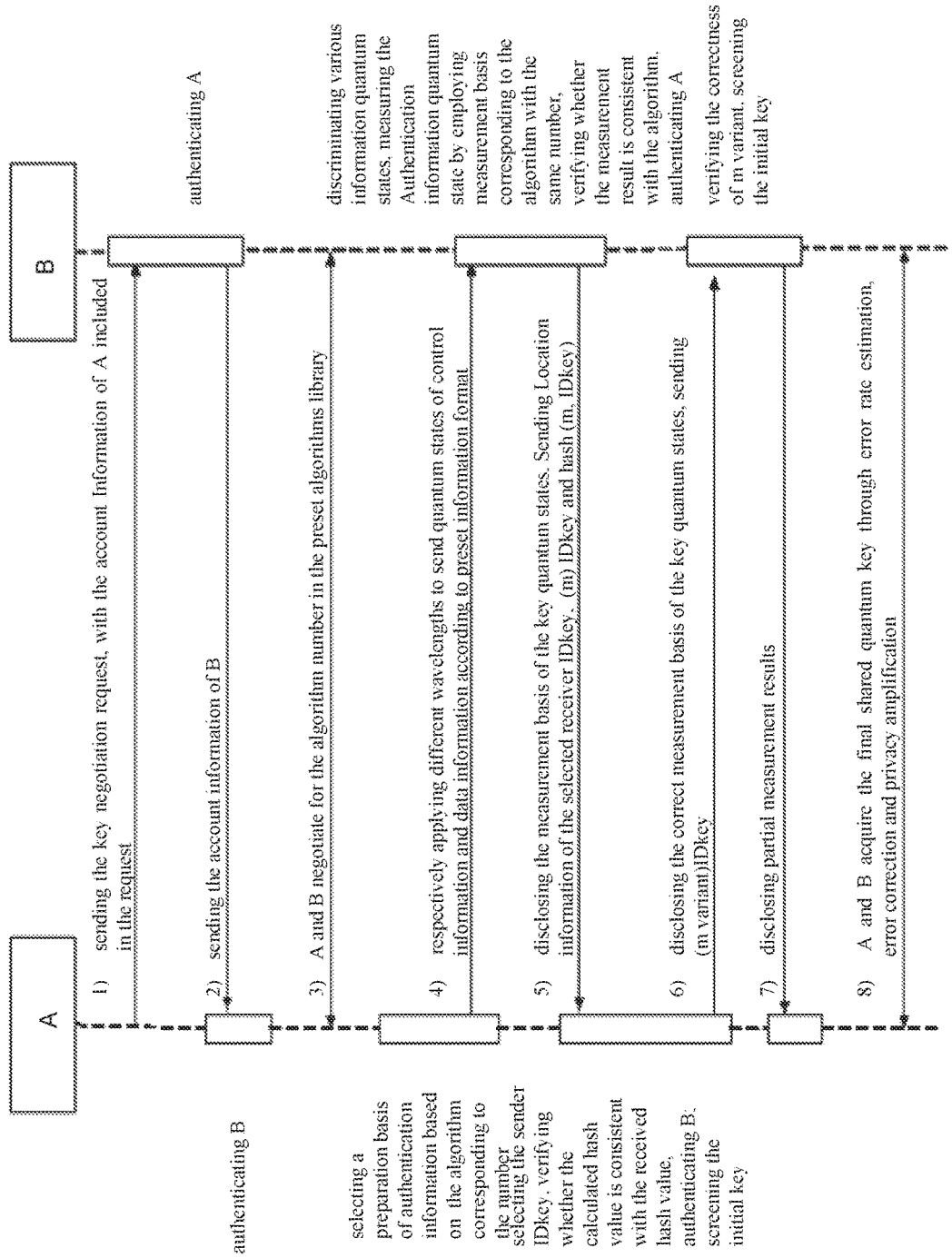
FIG. 13 illustrates an interactive process of the authentication system as provided in embodiments of the present invention.

By adopting the authentication method provided herein, the authentication devices that are respectively deployed on the receiver and sender quantum communication device realize dynamic authentication for the opposite-end device identity in the QKD process. With reference to FIG. 13, a brief description is provided as follows in terms of the interactive process of the authentication system for the QKD process. Wherein, the authentication device deployed on the sender quantum communication device is referred to as A, and the authentication device deployed on the receiver quantum communication device is referred to as B, (message) key means to encrypt the message with key, and hash( ) represents hash function.

1) The key negotiation request is sent from A to B, and the account information of A is included in the request;

2) B verifies the identity legitimacy of A and sends the account information of B to A;

3) A verifies the identity legitimacy of B according to the received account information; A and B negotiate for the algorithm number in the preset algorithms library;

4) A selects a basis for preparing authentication information according to the algorithm corresponding to the number, and respectively applies different wavelengths to send quantum states of control information and data information according to preset information format, wherein the data information comprises authentication information and randomly generated key information;

5) B filters various received information quantum states according to the different wavelengths and the preset information format; employs a basis of measurement corresponding to the algorithm with the same number in the preset algorithms library to measure the authentication information quantum state therein; sends the location information of the selected receiver IDkey, ciphertext of auxiliary authentication information m encrypted by using the receiver IDkey and the hash value of the character string spliced by m and IDkey and discloses the basis of measurement of key information quantum state when the measurement result is in line with the algorithm basis, otherwise terminates this QKD process.

6) A selects the corresponding sender IDkey from the sent local authentication information according to the location information; acquires the auxiliary authentication information m by decrypting the received cipher with the sender IDkey; calculates the hash value of the character string spliced by the m and the sender IDkey; then determines whether the calculated hash value is consistent with the received one; if so, screens the initial key, discloses the correct basis of measurement of the key information quantum state, and sends the ciphertext of the variant of auxiliary authentication information encrypted with the sender IDkey, while if not, terminating this QKD process.

7) B decrypts the received ciphertext of the variant of the auxiliary authentication information by using the receiver IDkey, wherein if the information acquired after decryption is consistent with the variant of the auxiliary authentication information m that is originally generated locally, screens the initial key according to the received correct basis of measurement, and discloses measurement results of partial key quantum state; if not, terminates this QKD process.

8) A and B acquire the final shared quantum key through error rate estimation, error correction and privacy amplification, wherein all the relevant information in the process of negotiation can be encrypted and decrypted by applying the corresponding IDkey of both parties.

It should be noted that what is provided is an embodiment of this system. In other embodiments, different interactive modes can be applied. For instance, the authentication based on the preset account information in 1) and 2) may not be performed and the negotiation of algorithm number in 3) may not be performed either. Instead, it is permissible that the sender and the receiver apply the same preset rules to select the algorithm in the preset algorithms library in each QKD process. As for the reverse authentication information sent by B to A in step 5), it is also permissible to adopt other forms different from those described in this embodiment, as long as A can authenticate the identity of B according to the reverse authentication information provided by B. These are variations of the system interactive process, that do not deviate from the core principle of the present invention; thus, all of these shall fall within the scope of the present invention.

The present invention is disclosed as above by means of various embodiments, that are not intended to limit the present invention. A person skilled in the art is able to make various alterations and modifications without departing from the spirit and scope of the present invention. Thus, the protection scope of the present invention shall be subject to the scope as specified by the claims of the present invention.

In a typical configuration, the computing device comprises one or more CPUs, a I/O interface, a network interface and a memory.

The memory may comprise volatile memory, random access memory (RAM) and/or NVRAM and other forms (such as read-only memory (ROM) or flash RAM) with regard to computer readable media. The memory is an example of computer readable media.

The computer readable media may include volatile, non-volatile, removable and non-removable media, which can realize information storage by any method or technology. The information can be computer readable instructions, data structures, program modules or other data. An example of computer storage medium includes, but is not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read only memory (CD-ROM), digital versatile disc (DVD) or other optical storages, cassette magnetic tape, tape, disk storages or other magnetic memory devices or any other non-transmission media that can be used to store information accessible by the computing device. According to definitions herein, the computer readable media excludes non-transitory media, such as modulated data signal and carrier wave.

A person skilled in the art should understand that the embodiments of the present invention can be provided as a method, system or computer program product. Accordingly, the present invention can adopt the form of an entire hardware embodiment, entire software embodiment or the embodiment combining software and hardware. In addition, the present invention can take the form of computer program products that can be implemented on one or more computer usable storage media (including, but not limited to disk storage device, CD-ROM and optical storage) containing computer readable program codes.

What is claimed is:

1. An authentication method for a quantum key distribution (QKD) process implemented in both a quantum communication device of a sender and a quantum communication device of a receiver involved in the QKD process, the method comprising:
   selecting, by a sender, a basis for preparing authentication information according to an algorithm in a preset algorithms library;
   sending, by the sender, quantum states of control information and of data information according to a preset information format over different wavelengths to a receiver respectively, the data information comprising authentication information and randomly generated key information;
   filtering, by the receiver, the quantum states according to the plurality of wavelengths and the preset information format;
   employing, by the receiver, a basis of measurement corresponding to the algorithm;
   measuring a quantum state of the authentication information with the basis of measurement;
   obtaining a reverse authentication information based on the measured quantum state of the authentication information;
   sending the reverse authentication information to the sender to authenticate the receiver when the quantum state of the authentication information corresponds to the algorithm;
   generating, by the sender, local authentication information according to the received reverse authentication information;
   determining whether the local authentication information corresponds with the reverse authentication information; and
   terminating the method when the local authentication information does not correspond with the reverse authentication information.

2. The method according to claim 1, further comprising:
   disclosing, by the receiver, the basis of measurement for measuring a quantum state of the key information via a pre-determined channel when the measured authentication information corresponds with the algorithm; and
   in response to the local authentication information corresponding to the reserve authentication information:
      determining, by the sender, a correct basis of measurement of the key information quantum state;
      screening an initial key in the sender;
      disclosing the correct basis of measurement of the key information quantum state to the receiver via the pre-determined channel;
      screening the initial key in the receiver in response to disclosing the correct basis of measurement; and
      acquiring a final shared quantum key in each of the sender and the receiver through error rate estimation, error correction and privacy amplification.

3. The method according to claim 1, further comprising:
   negotiating an algorithm number through a pre-determined channel in the receiver and the sender,
   wherein the algorithm number is negotiated before selecting the basis for preparing authentication information; and
   further wherein, the algorithm is selected from a plurality of preset algorithm libraries according to the negotiated algorithm number.

4. The method according to claim 3, wherein the algorithm number is synchronously transformed according to a preset strategy.

5. The method according to claim 3, wherein the algorithm number is cryptographically transmitted with a shared key preset by the receiver and the sender during negotiation for the algorithm number via the pre-determined channel.

6. The method according to claim 1, wherein the preset information format comprises using a control information as a prefix for the authentication information and key information.

7. The method according to claim 6, wherein a wavelength that carries a control information quantum state as the authentication information prefix is different from a wavelength that carries a control information quantum state as the key information prefix.

8. The method according to claim 6, wherein:
   a plurality of different codes are respectively applied to prefixes of the authentication information and the key information, the plurality of different codes comprising at least one of a plurality of different codes pre-negotiated by the receiver and the sender via a pre-determined channel,
   further wherein a basis for preparing a control information quantum states comprises at least one of a basis preset by the receiver and the sender, and a basis determined by pre-negotiation via the pre-determined channel.

9. The method according to claim 1, wherein the preset information format comprises applying a shared control information as prefixes of the authentication information and the key information, and
   wherein selecting the basis for preparing the authentication information according to the algorithm in the preset algorithms library comprises negotiating, between the receiver and the sender, a length of the authentication information between the control information and the key information via a pre-determined channel.

10. The method according to claim 1, wherein the reverse authentication information comprises location information corresponding to where the receiver selects a receiver authentication key, and at least one of: the receiver authentication key, and a hash value of the receiver authentication key,
wherein generating local authentication information comprises:
selecting a corresponding sender authentication key in the local authentication information according to received local information;
and using at least one of the corresponding sender authentication key and a hash value of the corresponding sender authentication key as the local authentication information.

11. The method according to claim 1, wherein the reverse authentication information comprises at least one of:
location information corresponding to where the receiver selects a receiver authentication key;
a ciphertext of auxiliary authentication information that is locally generated and encrypted by the receiver authentication key; and
a hash value of the character string formed by splicing the auxiliary authentication information and the receiver authentication key.

12. The method according to claim 11, wherein generating the local authentication information comprises:
selecting, by the sender, a corresponding sender authentication key in the local authentication information according to received location information;
decrypting the received auxiliary authentication information ciphertext by applying the corresponding sender authentication key to acquire the auxiliary authentication information;
calculating the hash value of the character string formed by splicing the acquired auxiliary authentication information and the sender authentication key; and
using the calculated hash value as the local authentication information.

13. The method according to claim 11, wherein determining whether the local authentication information corresponds with the reverse authentication information comprises:
applying a sender authentication key to encrypt a variant of the auxiliary authentication information acquired by decryption;
transmitting the encrypted ciphertext via a pre-determined channel;
decrypting the received ciphertext with the receiver authentication key in response to receiving the ciphertext;
determining whether the decrypted information corresponds with the variant of the auxiliary authentication information; and
terminating the QKD process when the decrypted information does not correspond with the variant of the auxiliary authentication information.

14. The method according to claim 1, wherein selecting the basis for preparing the authentication information according to the algorithm in the preset algorithms library comprises performing, by the receiver and the sender, an authentication process on the opposite-end device with the preset account information via a pre-determined channel, wherein the QKD method is terminated when any device fails the authentication process.

15. The method according to claim 1, wherein the algorithm in the preset algorithms library is performed by selecting at least one of the basis for preparation and the basis of measurement according to a location of each bit of authentication information in the data information.

16. The method according to claim 15, wherein selecting at least one of the basis for preparation and the basis of measurement comprises selecting a corresponding horizontal polarization basis, vertical polarization basis, levorotatory polarization basis, or dextrorotatory polarization basis according to different results of the location information of each bit in the data information.

17. An authentication device for a quantum key distribution (QKD) process, the device comprising a central processing unit and memory, the memory comprising program modules comprising:
a quantum state sending unit configured to select a basis for preparing authentication information according to an algorithm in a preset algorithms library, and to send quantum states of control information and data information according to a preset information format over different wavelengths to an opposite-end device involved in the QKD process, respectively, wherein the data information comprises authentication information and randomly generated key information;
a response information receiving unit configured to receive reverse authentication information returned by the opposite-end device;
a local authentication information generating unit configured to generate local authentication information according to the received reverse authentication information;
a sender authentication determining unit configured to determine whether the local authentication information is consistent with the reverse authentication information; and
a distribution process terminating unit configured to terminate the QKD process when the local authentication information is not consistent with the reverse authentication information,
wherein the device is deployed on a sender quantum communication device involved in the QKD process.

18. The authentication device for the QKD process according to claim 17, wherein in addition to the reverse authentication information, information received by the response information receiving unit further comprises a basis of measurement used for measuring a quantum state of the key information.

19. The authentication device for the QKD process according to claim 18, wherein the program modules further comprise:
an initial key screening unit configured to determine a correct basis of measurement of the quantum state of the key information when the local authentication information is consistent with the reverse authentication information, and to screen an initial key;
a correct basis of measurement disclosing unit, configured to disclose the correct basis of measurement of the quantum state of the key information via a pre-determined channel;
a sender quantum key acquiring unit configured to acquire a final shared quantum key through error rate estimation, error correction and privacy amplification; and
an algorithm number negotiating unit configured to negotiate with the opposite-end device for an algorithm number via the pre-determined channel before the quantum state sending unit is activated, and wherein the quantum state sending unit selects the basis for preparing the authentication information by selecting the algorithm in the preset algorithms library according to the algorithm number determined by the algorithm number negotiating unit, and selecting the basis for preparing the authentication information according to the algorithm.

20. An authentication device for a quantum key distribution (QKD) process deployed in a receiver in the QKD process, the device comprising a central processing unit and memory, the memory comprising program modules comprising:

a quantum state receiving unit configured to receive quantum states of control information and of data information sent by an opposite-end device involved in the QKD process according to a present information format over different wavelengths, and to discriminate various received information quantum states;

a quantum state measuring unit configured to select a basis of measurement according to an algorithm pre-selected by the opposite-end device from a preset algorithms library, and to apply the basis of measurement to a quantum state of authentication information;

a receiver authentication determining unit configured to determine whether the quantum state of the authentication information is consistent with the selected algorithm;

a reverse authentication information sending unit configured to send reverse authentication information to authenticate a receiver quantum communication device to the opposite-end device; and a distribution process terminating unit, configured to terminate the QKD process when the quantum state of the authentication information is not consistent with the selected algorithm.

* * * * *